(12) United States Patent
Chilson et al.

(10) Patent No.: US 8,210,791 B2
(45) Date of Patent: Jul. 3, 2012

(54) AUTOMATIC TRANSPORT LOADING SYSTEM AND METHOD

(75) Inventors: Gerald Edward Chilson, Alanson, MI (US); Wayne David Ross, Petoskey, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 1114 days.

(21) Appl. No.: 12/110,615

(22) Filed: Apr. 28, 2008

(65) Prior Publication Data

US 2010/0266381 A1  Oct. 21, 2010

Related U.S. Application Data

(63) Continuation-in-part of application No. 11/766,646, filed on Jun. 21, 2007, which is a continuation-in-part of application No. 11/119,588, filed on May 2, 2005, now Pat. No. 7,648,329.

(60) Provisional application No. 60/567,729, filed on May 3, 2004.

(51) Int. Cl.
  *B65G 67/02* (2006.01)
(52) U.S. Cl. .......................... 414/809; 180/167
(58) Field of Classification Search .................. 414/390, 414/391, 392, 399, 636, 809; 701/26, 221
  See application file for complete search history.

(56) References Cited

U.S. PATENT DOCUMENTS

| | | |
|---|---|---|
| 3,294,178 A | 12/1966 | Lawson et al. |
| 3,768,586 A | 10/1973 | Thompson et al. |
| 3,780,893 A | 12/1973 | Lassig et al. |
| 3,993,156 A | 11/1976 | Rubel |
| 4,006,790 A | 2/1977 | Kawano et al. |
| 4,079,803 A | 3/1978 | Takada et al. |
| 4,309,758 A | 1/1982 | Halsall et al. |
| 4,328,545 A | 5/1982 | Halsall et al. |
| 4,347,573 A | 8/1982 | Friedland |
| 4,437,533 A | 3/1984 | Bierkarre et al. |
| 4,456,088 A | 6/1984 | Nishiki et al. |
| 4,491,918 A * | 1/1985 | Yuki et al. ........................ 701/50 |
| 4,530,056 A | 7/1985 | MacKinnon et al. |
| 4,566,032 A | 1/1986 | Hirooka et al. |
| 4,595,331 A | 6/1986 | Thompson et al. |
| 4,630,216 A | 12/1986 | Tyler et al. |
| 4,656,406 A | 4/1987 | Houskamp |
| 4,668,859 A | 5/1987 | Winterer |
| 4,714,399 A | 12/1987 | Olson |

(Continued)

FOREIGN PATENT DOCUMENTS

DE  3741259 A1  6/1989

(Continued)

OTHER PUBLICATIONS

SGV DockPro, Automated Trailer Loading System; JBT Trailer Loading Brochure; 3 pages; http://www.jbtcorporation.com/.

(Continued)

*Primary Examiner* — James Keenan
(74) *Attorney, Agent, or Firm* — Dickinson Wright PLLC

(57) ABSTRACT

A method and system for automatically loading and unloading a transport is disclosed. A guidance system follows a travel path to a position near the transport and then a sensor profiles a transport so that a transport path is determined for an AGV to follow into the transport to place a load and for exiting the transport upon placement of the load.

8 Claims, 11 Drawing Sheets

U.S. PATENT DOCUMENTS

| | | | |
|---|---|---|---|
| 4,716,530 A | 12/1987 | Ogawa et al. | |
| 4,727,492 A | 2/1988 | Reeve et al. | |
| 4,729,660 A | 3/1988 | Tsumura et al. | |
| 4,736,812 A | 4/1988 | Livneh | |
| 4,777,601 A | 10/1988 | Boegli | |
| 4,780,817 A | 10/1988 | Lofgren | |
| 4,788,498 A | 11/1988 | Uemura | |
| 4,800,977 A | 1/1989 | Boegli et al. | |
| 4,802,096 A | 1/1989 | Hainsworth et al. | |
| 4,811,227 A | 3/1989 | Wikstrom | |
| 4,811,228 A * | 3/1989 | Hyyppa | 701/25 |
| 4,815,008 A | 3/1989 | Kadonoff et al. | |
| 4,816,998 A | 3/1989 | Ahlbom | |
| 4,817,000 A | 3/1989 | Eberhardt | |
| 4,817,750 A | 4/1989 | Ishida et al. | |
| 4,846,297 A | 7/1989 | Field et al. | |
| 4,847,769 A | 7/1989 | Reeve | |
| 4,855,915 A | 8/1989 | Dallaire | |
| 4,869,635 A | 9/1989 | Krahn | |
| 4,906,159 A | 3/1990 | Sabo et al. | |
| 4,939,650 A | 7/1990 | Nishikawa | |
| 4,941,794 A | 7/1990 | Hara et al. | |
| 4,950,118 A * | 8/1990 | Mueller et al. | 414/274 |
| 4,968,209 A | 11/1990 | Noble | |
| 4,990,841 A | 2/1991 | Elder | |
| 5,015,145 A | 5/1991 | Angell et al. | |
| 5,052,882 A | 10/1991 | Blau et al. | |
| 5,058,023 A | 10/1991 | Kozikaro | |
| 5,072,222 A | 12/1991 | Fockens | |
| 5,075,853 A | 12/1991 | Luke, Jr. | |
| 5,095,214 A | 3/1992 | Eder | |
| 5,175,415 A | 12/1992 | Guest | |
| 5,202,832 A | 4/1993 | Lisy | |
| 5,218,556 A | 6/1993 | Dale, Jr. | |
| 5,219,036 A | 6/1993 | Schwager et al. | |
| 5,231,374 A | 7/1993 | Larsen et al. | |
| 5,244,055 A | 9/1993 | Shimizu | |
| 5,276,618 A | 1/1994 | Everett, Jr. | |
| 5,280,431 A | 1/1994 | Summerville et al. | |
| 5,281,901 A | 1/1994 | Yardley et al. | |
| 5,329,132 A | 7/1994 | Van de Pas et al. | |
| 5,341,130 A | 8/1994 | Yardley et al. | |
| 5,367,456 A | 11/1994 | Summerville et al. | |
| 5,404,087 A | 4/1995 | Sherman | |
| 5,434,781 A | 7/1995 | Alofs et al. | |
| 5,446,356 A | 8/1995 | Kim | |
| 5,450,320 A | 9/1995 | Tsubaki et al. | |
| 5,455,669 A | 10/1995 | Wetteborn | |
| 5,467,084 A | 11/1995 | Alofs et al. | |
| 5,524,723 A | 6/1996 | Gramling et al. | |
| 5,525,884 A | 6/1996 | Sugiura et al. | |
| 5,594,448 A | 1/1997 | d'Hont | |
| 5,617,023 A | 4/1997 | Skalski | |
| 5,619,207 A | 4/1997 | d'Hont | |
| 5,652,593 A | 7/1997 | Rench et al. | |
| 5,672,947 A | 9/1997 | Hisada et al. | |
| 5,745,235 A | 4/1998 | Vercammen et al. | |
| 5,764,014 A | 6/1998 | Jakeway et al. | |
| 5,801,506 A * | 9/1998 | Netzler | 318/587 |
| 5,803,701 A | 9/1998 | Filiberti et al. | |
| 5,804,942 A | 9/1998 | Jeong | |
| 5,825,481 A | 10/1998 | Alofs et al. | |
| 5,831,717 A | 11/1998 | Ikebuchi | |
| 5,916,285 A | 6/1999 | Alofs et al. | |
| 5,925,080 A | 7/1999 | Shimbara et al. | |
| 5,938,710 A | 8/1999 | Lanza et al. | |
| 5,949,530 A | 9/1999 | Wetteborn | |
| 5,991,011 A | 11/1999 | Damm | |
| 6,049,745 A | 4/2000 | Douglas et al. | |
| 6,092,010 A | 7/2000 | Alofs et al. | |
| 6,128,585 A | 10/2000 | Greer | |
| 6,241,453 B1 * | 6/2001 | Upmeyer | 414/667 |
| 6,259,979 B1 * | 7/2001 | Holmquist | 701/23 |
| 6,272,406 B2 | 8/2001 | Alofs et al. | |
| 6,305,295 B1 | 10/2001 | Buck | |
| 6,308,118 B1 | 10/2001 | Holmquist | |
| 6,308,134 B1 | 10/2001 | Croyle et al. | |
| 6,377,888 B1 | 4/2002 | Olch | |
| 6,379,107 B1 | 4/2002 | Iwasaki et al. | |
| 6,437,561 B1 | 8/2002 | Bartingale et al. | |
| 6,539,294 B1 | 3/2003 | Kageyama | |
| 6,650,407 B2 | 11/2003 | Jamieson et al. | |
| 6,650,425 B2 | 11/2003 | Kubota et al. | |
| 6,732,024 B2 | 5/2004 | Wilhelm Rekow et al. | |
| 6,741,364 B2 | 5/2004 | Lange et al. | |
| 6,778,092 B2 | 8/2004 | Braune | |
| 6,813,548 B2 | 11/2004 | Matsumoto et al. | |
| 7,153,081 B2 | 12/2006 | Watanabe | |
| 2001/0001843 A1 | 5/2001 | Alofs et al. | |
| 2002/0099481 A1 | 7/2002 | Mori | |
| 2003/0106731 A1 | 6/2003 | Marino et al. | |
| 2003/0165373 A1 | 9/2003 | Felder et al. | |
| 2003/0234325 A1 | 12/2003 | Marino et al. | |
| 2004/0122570 A1 | 6/2004 | Sonoyama et al. | |
| 2005/0244259 A1 | 11/2005 | Chilson et al. | |
| 2006/0178828 A1 | 8/2006 | Moravec | |
| 2006/0276958 A1 | 12/2006 | Crumbaugh | |

FOREIGN PATENT DOCUMENTS

| | | |
|---|---|---|
| EP | 0556689 A2 | 8/1993 |
| EP | 0952427 A2 | 10/1999 |
| EP | 0952427 A3 | 9/2000 |
| GB | 2143395 A | 2/1985 |
| GB | 2158965 A | 11/1985 |
| JP | 59075315 A | 4/1984 |
| JP | 62269899 A | 11/1987 |
| WO | 9209941 A1 | 6/1992 |

OTHER PUBLICATIONS

Trailer Loading Application; Kraft Trailer Loading Case Study; 2 pages; http://www.jbtcorporation.com/.

Hagemann, A.; NAV 200 SICK Navigation; Jan. 2008; pp. 1-67; http://www.sick.com/.

ATL Solutions Automatic Trailer Loading & Unloading; 6 pages; http://www.egemin.com.

Jervis B. Webb Company, Automatic Truck Unloading with AGVs, 2001, 3 pages, Jervis B. Webb Company, Farmington Hills, MI, USA.

Scheding, S., Experiments in Autonomous Underground Guidance, Proceedings of the 1997 IEEE International Conference on Robotics and Automation, Apr. 1997, pp. 1898-1903, Albuquerque, New Mexico.

* cited by examiner

AUTOMATIC TRANSPORT LOADING SYSTEM AND METHOD

CROSS-REFERENCE TO RELATED APPLICATIONS

This application claims priority to and is a continuation-in-part of U.S. patent application Ser. No. 11/766,646, filed Jun. 21, 2007, which is a continuation-in-part of U.S. patent application Ser. No. 11/119,588, filed May 2, 2005, which claims the benefit of U.S. Provisional Application No. 60/567,729, filed May 3, 2004, the entire disclosure of these applications being considered part of the disclosure of this application and hereby incorporated by reference.

BACKGROUND OF THE INVENTION

The present invention is generally directed to material handling vehicles and, more particularly, to an automatic guided vehicle that is capable of automatically loading and unloading a transport, including loads near the end of the transport with minimal interference, even when the transport floor is vertically offset from or angled relative to the floor of the loading bay or a dock ramp extending between the transport floor and the loading bay floor.

Automatic guided vehicles (AGVs) are used throughout the material handling industry to transport loads. The term AGV is commonly used to refer to robust vehicle designs having any of a number of available automated guidance systems. Automatic guided carts (AGCs) is a term commonly used to refer to a less robust vehicle used for similar but less complicated applications. Throughout this application, including the claims, the term AGV shall mean and include both AGVs and AGCs, as well as any other vehicle that is automatically guided.

Current lighter duty AGV designs generally include a frame with swivel castors located at the four corners of the frame. Other features may include a drive wheel assembly and rigid castors for directional control of the cart. In one current design, two rigid castors are fixed to the frame and located approximately midway between the swivel castors on each side of the cart frame. The two pair of swivel castor axes and the rigid castor axis are generally parallel to each other. The steerable driving unit is attached to the cart frame, generally by way of a plate that is hinged and spring loaded from the cart frame to ensure that the steerable drive wheel maintains adequate traction with the support surface. In another embodiment, a fixed drive wheel propels the AGV, and a steerable castor wheel directs the movement of the AGV. Heavy duty AGV designs generally include a heavy duty frame and at least three wheels, with at least one of the wheels being a drive wheel and at least one wheel being a steering wheel directed by a guidance system. Many of these AGV designs are similar to existing vehicles for moving loads in a manufacturing or distribution setting but are automatically guided.

An AGV includes a guidance system that controls its movement. Known guidance systems in use today include wire guidance, laser guidance, magnetic tape guidance, odometry guidance, inertial guidance, and optical guidance, and each have their own associated positives and negatives. For example, inertial guidance is susceptible to tracking errors, where the travel distance and direction measured by the AGV differs from the actual distance and direction of travel. Though they can be minimized, tracking errors may compound over long travel distances and the system must adjust for these errors, for example, by utilizing waypoint reference markers (magnetic paint, Radio Frequency Identification (RFID) tags, etc.) along the designated path.

Laser guidance systems use special markers that the AGV senses and uses to control its travel. This type of system is susceptible to obstruction of markers and, most notably, requires markers to be present in any environment of travel. If the path of the AGV is modified, the markers must be physically moved. Further, an AGV with this type of guidance system can only travel in areas that have these special markers, which, in the context of this invention, require that any transport to be loaded or unloaded include markers.

One difficulty associated with the automatic loading and unloading of a transport is the variable position of the transport in relation to the loading dock. Transports are usually positioned manually; for example, by a driver in the case of a truck. This manual positioning results in an unknown variability in the position of the transport. As a driver positions a transport, such as a trailer at the loading dock, he or she may be unable to perfectly square the trailer with the dock door. This will leave the trailer at a skewed angle in reference to the dock door. Since the angle is unknown and can vary at each positioning at the dock, an AGV cannot effectively guide and deliver loads in the trailer, unless the skew is adjusted or the AGV has the capability of detecting and compensating for this trailer skew. The prior art has addressed this problem by using skid plates to position the transport in relation to the loading docks, however this is a costly and inefficient process. The trailer may also be positioned offset from the optimal position relative to the dock door. In loading wider loads by AGVs, an offset as little as one inch may cause problems during the loading process.

The transport is generally positioned within a transport loading area outside of a loading bay door for loading. Many variances in the positioning of the transport, as well as between the transport and the loading dock, may cause difficulties in the AGV loading the transport and, in particular, the end of the transport. The difficulty associated with automatic loading and unloading of a transport is that the AGV must be able to overcome the difference in height between the transport and the dock. Different types of transports, as well as different styles of the same transport, will vary in height. Furthermore, the height of a particular transport is not static; as the transport is loaded the suspension will compress, resulting in a change in the height of the transport. In order to allow robust operation, the AGV must be able to operate with varying transport height and, therefore, varying height differences between the transport and dock. The variance in height may cause the load to contact the roof of the transport or the lip of the roof at the entrance or threshold of the transport. Any contact between the load and the transport will cause problems in the loading of the transport. The prior art has addressed this problem by using hydraulic or other types of jacks to stabilize and level the transport; however, this is another costly and inefficient process.

The variability in position of the transport may prohibit the automatic loading of the transport, and almost certainly will reduce its efficiency. For example, the most efficient loading process positions the loads as closely to each other as possible, and any variability in the expected position of the transport will tend to increase the separation of the loads.

Other problems may also occur, which cause differences between the actual location of the AGV and the expected position, as determined by the guidance system. One cause of such problems is slick surfaces on which the AGV travels, including the loading bay floor, dock ramp, and transport floor. As many transports are commonly semi-truck trailers, they may be used to haul a variety of products which may spill or leak slippery substances. The transports are also exposed to many other environmental conditions, including moisture that condenses on the floor of the transport and, in some cases, forms a frost or ice layer on the transport floor. The transports may be used at a variety of facilities and, in some circumstances, loading equipment may leak slippery substances such as oil, hydraulic fluid, and other fluids onto the transport floor. As the AGV loads and unloads various transports, these substances may be transferred by the AGV wheels to the dock ramp and loading bay floor. As the floor of the transport and the dock ramp may commonly be at an angle offset from level, it is easy for the AGV to experience wheel slippage, whether caused by water, ice, oil, or other substances. Any wheel slippage may cause the actual position of the AGV to vary from the expected position determined by the AGV.

As expected, any differences between the expected position and actual position may cause errors in placement of loads, undesirable contact of the AGV or load with transport walls, or future guidance errors. Some systems have been developed to ensure that the load or AGV does not contact the transport side walls. One such solution has been to continuously measure the distance of the AGV from the walls and constantly adjust to keep the AGV centered between the walls. One problem with this system is that it may slow down the loading and unloading of transports, as the AGV must constantly measure and adjust for any variations.

A dock ramp may compensate for any variation between the height of the transport floor and the loading bay floor. The transition between the two may require a steep incline or decline between dock and transport, which can cause guidance difficulties and end-of-trailer loading difficulties. For example, an AGV that uses a laser guidance system may lose the target as it moves up an incline or down a decline, due to the fact that the laser will be pointing either above or below the target. The difficulty with end-of-trailer loading for the above described transport and transport loading area facilities is that if the AGV is not at an equal angle to the transport floor, such as the majority of the AGV being situated on the dock ramp or loading facility floor, it may be difficult for the AGV to lower its load to the transport floor and then easily remove its forks from the pallet pockets. More specifically, if the transport floor is not aligned both vertically and angularly with the loading facility floor or dock ramp, it may be difficult to withdraw the forks from the pockets on the pallets as the tip of the fork engages one of the top and bottom, and the portion of the fork nearest to the AGV engages the other of the top and bottom. Therefore, when the AGV attempts to back out of the transport after dropping the last load, the last load may be pulled backwards with the AGV. The angle of the two supporting surfaces may become greater as the transport is loaded. As more loads are added to the transport, the suspension becomes compressed. As the suspension compresses, the height of the trailer lowers, thereby increasing the angle between the transport floor and the supporting surface of the AGV. The dock ramp is typically formed from steel and may become slippery, causing errors with the guidance system.

SUMMARY OF THE INVENTION

In view of the above, a need exists for an AGV design that effectively, efficiently, and accurately uses guidance systems to automatically load and unload a transport. More particularly, the present invention is directed to an AGV design that is capable of loading and unloading a transport that may not be in its expected position as well as compensate or adjust for any variations between the expected position and actual position of the AGV without the need for continuous updates that may slow down movement an AGV while placing or retrieving loads in the transport.

To meet these and other needs that will be apparent to those skilled in the art based upon this description and the appended drawings, the present invention is directed to a method and system for loading and unloading a transport by an AGV. The AGV first engages a load. The AGV with the engaged load is then guided by a first guidance system to a known position. From this position, the AGV determines the location of the transport and then proceeds to place the load on the transport. The AGV then proceeds to the next desired location.

In another embodiment of the present invention, the AGV first engages a load. The AGV with engaged load is then guided by a guidance system to a known position. From this position, the guidance system determines the proper load position on the transport, adjusts itself to guide the AGV with the load to that position, and deposits the load. The adjusted guidance system is then used to guide the AGV back to approximately the known position described above, wherein the original unadjusted guidance system then resumes its control of the travel of the AGV.

In another embodiment of the present invention, the AGV scans the position of the transport to determine if the floor transport is vertically offset or if the floor of the transport is angled relative to the floor of the loading bay or dock ramp. When the last AGV places the last load, or at times one of the last few loads inward of the door, the AGV adjusts its forks angularly relative to the AGV to compensate for any angular or vertical offset, such that the AGV forks smoothly enter or exit the pallet pockets without changing the position of the placed load. Therefore, the system actively measures the position of the transport and compensates the position of the AGV forks on the last couple of loads placed inward of the door of the transport.

In another embodiment, the system uses regular, but not continuous, updates within the transport to check that the expected location of the AGV matches the actual location of the AGV. More specifically, the laser sensor or other sensors may at regular intervals scan the interior of the transport and update the location of the AGV within the transport, if necessary. Regular updates minimize the processing time needed to determine position, yet ensure that the guidance system on the AGV accurately determines the position of the AGV within the transport.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
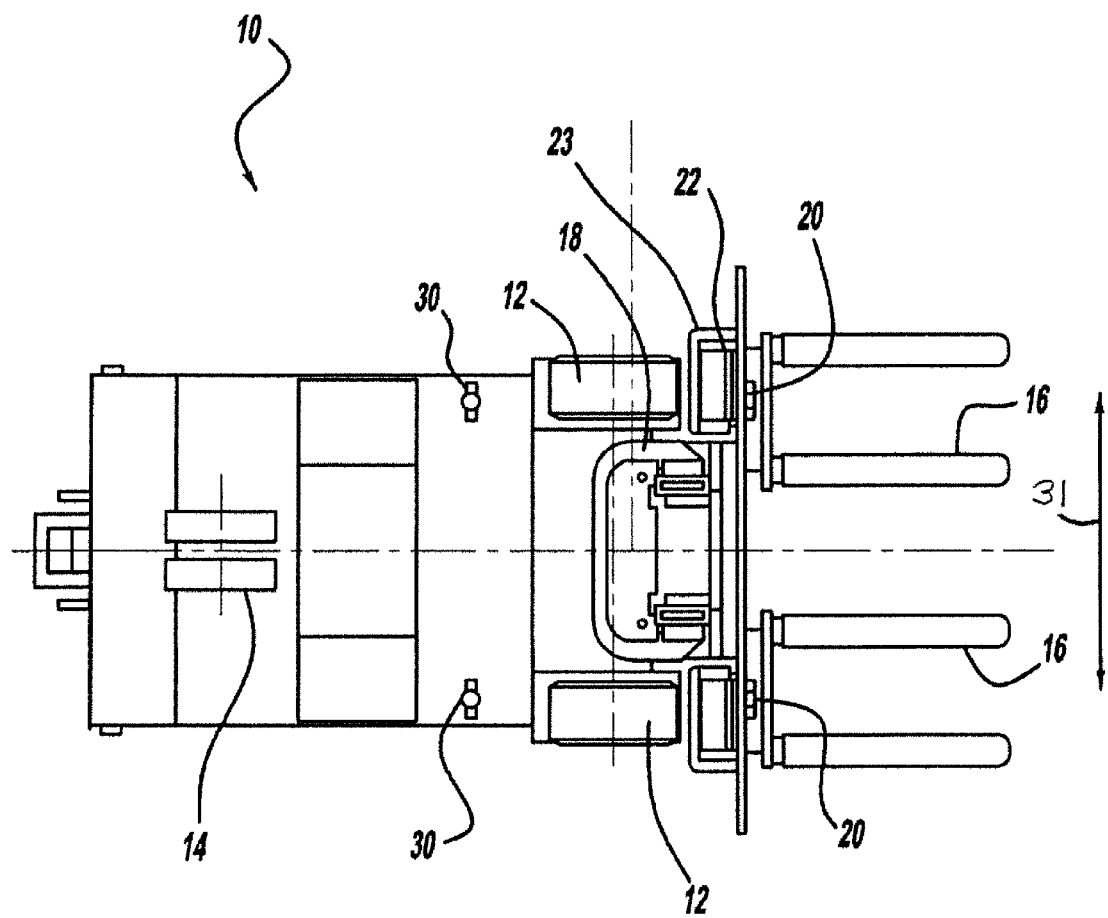
FIG. 1 is an overhead view of an AGV according to the present invention.
Figure 2:
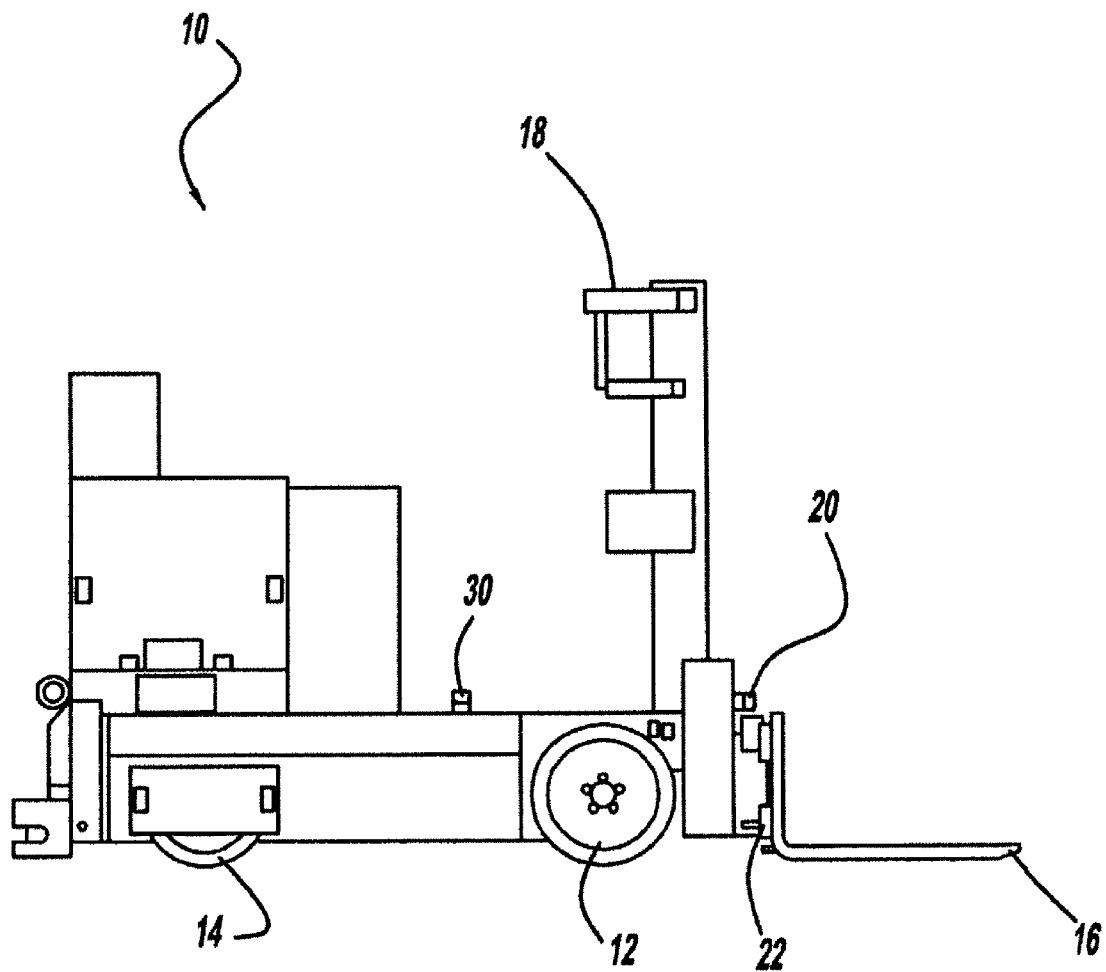
FIG. 2 is a side view of an AGV according to the present invention.

An automated guided vehicle 10 according to the present invention is illustrated and described with reference to the figures. It should be appreciated that the applications for the automatic loading and unloading of a transport according to the present invention may be used in a variety of applications beyond the illustrated AGV. For example, the present invention may be used with automated guided vehicles of a variety of configurations, as well as other material handling vehicles.

The AGV 10 includes a steering and drive mechanism that is used to propel and steer the AGV 10. In the illustrations shown, the steering and drive mechanism comprises drive wheels 12 and steerable wheel 14 that are coupled with a guidance system and used to propel and steer the AGV 10. The guidance system turns the steerable wheel 14 as the AGV 10 is propelled, thus steering the AGV 10. Additionally, the drive wheels 12 are preferably dual drive wheels wired in series to create an electrical differential. Different propulsion systems may also be used, for example differential or "panzer" steer with swivel casters or through the use of master/slave motor controllers for the drive wheels.

The guidance system can be one of any number of known guidance systems. In a preferred embodiment, two guidance systems are used, as more fully described below. The primary guidance system is an inertial guidance system. The preferred system uses a programmed path of travel. The position of the steerable wheel 14 is known and is capable of being maneuvered. The distance and direction traveled by the AGV 10 is measured, preferably but not necessarily by a track wheel. A system with encoders on each drive wheel and a steering encoder may be used in conjunction with or separate from the track wheel to track the distance and direction traveled by the AGV 10. As the AGV 10 travels, the steerable wheel 14 is turned to certain positions at certain distances. In this manner, the AGV 10 can be used to travel over almost any surface by just specifying the position of the steerable wheels 14 and the distance to be traveled while in that position. This detailed description is given by illustration only, and the use of a different type of guidance system (for example, a laser guidance system), as the primary guidance system is within the spirit and scope of the invention.

The AGV 10 further includes a load capture mechanism, such as clamps; or, preferably, the fork pairs 16 shown in the illustrations that are used to engage a load 60. The load 60 preferably includes a pallet 72 having fork pockets or pallet pockets 74 for engaging with the fork pairs 16, as is well known in the art. The fork pair 16, as is well known in the art, generally includes a horizontal segment 62, a vertical segment 70, and a segment formed with a transition section 68 therebetween. The horizontal segment 62 generally includes a lower surface 64 and an upper surface 63, engaging the pallet 72 when the AGV 10 lifts the pallet 72. The horizontal segment 62 also includes fork tips 66. The vertical segment 64 of the fork pairs 16 is coupled to an elevator mechanism 18 or mast. The elevator mechanism 18 allows the load to be raised or lowered to a variety of heights, for example, for stacking loads onto one another. The forks 16 are generally mounted to a fork carriage 17. The forks 16 are coupled to the fork carriage 17, which is in turn coupled to the elevator mechanism 18. In a preferred embodiment, the AGV 10 further includes two sets of distance sensors, rear distance measuring devices 20, and front distance measuring devices 30. Both sets of distance measuring devices are operatively coupled to the steering and drive mechanism for use in guiding the AGV 10, as more fully described below.

Figure 3:
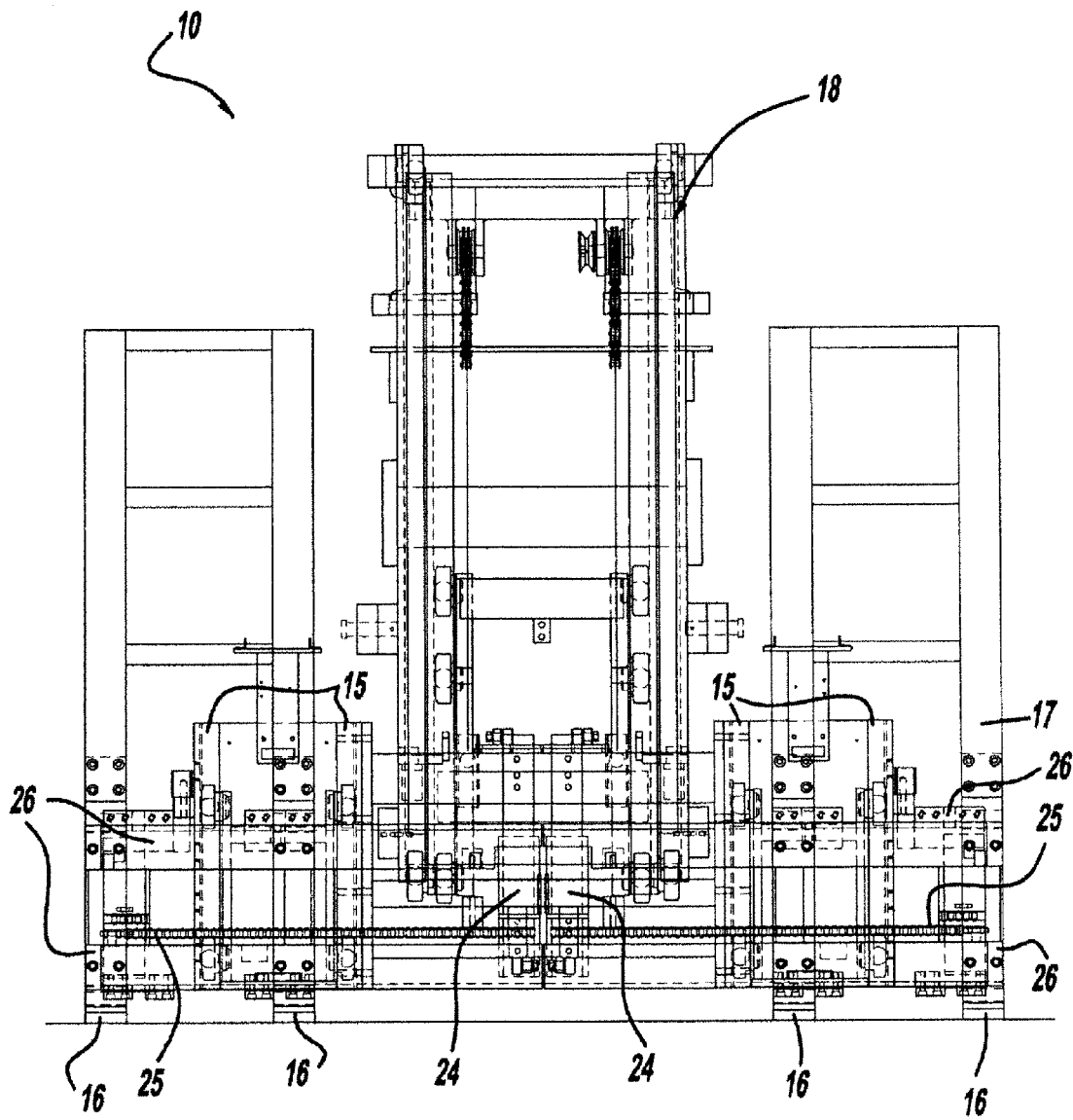
FIG. 3 is a front view of an AGV according to the present invention.

The load capture mechanism described above may be capable of shifting the engaged load horizontally by means of a side-shifting mechanism 22. As illustrated in FIG. 3, the elevator mechanism 18 may be equipped with two fork pairs 16. Each fork pair 16 is mounted to a separate fork carriage 17, and each fork carriage 17 is mounted to the elevator mechanism 18. The elevator mechanism 18 can raise the fork carriages 17 together as needed to vertically position the fork pairs 16 and/or loads. The fork carriages 17 are also mounted on vertical slides 15, which may be equipped with hydraulic cylinders to allow up to six inches of independent lifting ability per fork pair 16 in addition to any lift capability provided by the elevator mechanism 18. This independent lifting allows the AGV to travel and position its fork pairs 16 into a pair of adjacent loads. Raising only one fork pair 16 six inches allows the AGV to pickup a single load from a pair of adjacent loads. This same operation, along with the side shifting mechanism 22, allows the AGV to place two loads side by side or in single bin storage racks. To provide the side shift capability, each fork carriage 17 is equipped with a hydraulic motor 24 with a chain drive. The chain 25 will pull the fork carriage 17 to the desired position.

In a preferred embodiment, the carriage slide rails 26 are designed to allow the fork carriage 17 to travel past center, such that the AGV is capable of dropping a load in the center position of the AGV. To do this, one fork pair 16 is shifted to one side and out of the way, thus allowing the other fork pair 16 to be positioned at the center of the AGV.

The side-shifting mechanism 22, in conjunction with the elevator mechanism 18 and the forward and backward travel of the AGV 10, allows the load to be adjusted in all three dimensions when engaged to the load capture mechanism of the AGV 10. In a preferred embodiment illustrated in FIG. 1, each of the fork pairs 16 can be independently moved horizontally, i.e., in the directions of arrow 31. Additionally, each of the side-shifting mechanisms 22 includes an encoder 23 for tracking the movement of the fork pairs 16. These encoders 23 preferably are capable of tracking both the position and rate of change in position of the fork pairs 16 in the horizontal direction. These encoders 23 are in communication with the guidance system of the AGV 10 and are used to properly position the fork pairs 16. The horizontal shifting of the fork pairs 16 is described more fully below in conjunction with the description of loading the transport 50.

The AGV 10 as described above is designed to be used in the automatic loading and unloading of a transport 50. These processes will be described in relation to an enclosed truck trailer at a loading dock location of a factory, but similar processes could be described for any similar transport 50; for example, a flatbed trailer or rail car.

Automatically Loading a Transport:

In order to load a transport 50, the AGV 10 must first engage the load. In a preferred embodiment, as described above, this is accomplished by the use of fork pairs 16 of the AGV 10 that mate with fork pockets of the load, usually integral with a pallet, and by using the elevator mechanism 18 to lift the load off the ground. The mating of the fork pairs 16 to the fork pockets is a difficult operation, and requires precision. Preferably, the load is placed in a known location with a relatively high degree of precision. The guidance system of the AGV 10 may then be programmed to interact with the load at this known location, so that the fork pairs 16 and fork pockets properly mate with each other. If placing the load into a known position with precision is difficult or impractical, the AGV 10 could be modified to allow for a wider range of load positioning. For example, optical sensors could be positioned on or near the tips of the fork pairs 16 and could be used to detect the fork pockets of the load. When the AGV 10 approaches the load location, these optical sensors could be switched on to find the fork pockets. Based on the detected position of the fork pockets, the AGV 10 would modify its path of travel or, preferably, the fork pairs 16 could be adjusted by means of the side-shifting mechanism 22 such that the forks 16 and fork pockets interact. While this allows more robust operation, the additional components required make this a more expensive and less desirable configuration.

Once the AGV 10 has been loaded, the AGV 10 will travel to the loading dock area of the factory. The transport 50 (in this case, a truck trailer) will be located adjacent to the loading dock. In some cases, a loading ramp is used in order to facilitate the travel of the AGV 10 from the dock to the transport 50. The loading ramp is designed to ease the transition of the AGV 10 between the two different surfaces. Because this transition may be somewhat uneven, the track wheel, if used, may need to be lifted and rendered inoperable to avoid it being damaged.

The AGV 10 will use its primary guidance system to transport the load to the loading dock and near to the transport 50. In a preferred embodiment, the AGV 10 will use its primary guidance system to move to the threshold of the opening 52 of the transport 50. At this point, a secondary guidance system of the AGV 10 will be enabled and used to guide the AGV 10 into the intended load position. In a preferred embodiment, the secondary guidance system comprises the two sets of distance measuring devices 20 and 30 described above. The rear distance measuring devices 20 are utilized to operate when the AGV 10 is traveling forward, and the front distance measuring devices 30 are utilized to operate when the AGV 10 is traveling backward. The preferred distance measuring devices are analog sonic sensors, though a laser-type, a laser scanner with moving beam-type, or an optical/vision system could be used instead. Each set of the distance measuring devices will operate such that the AGV 10 will seek the middle of the transport 50. This is accomplished by using the sensors such that the distance from one sensor to the side 54 of the transport 50 is subtracted from the distance from the other sensor to the other side 54 of the transport 50 to create a +/− error signal. This +/− error signal can be used by the steering mechanism of the AGV 10 to guide the AGV 10 in the appropriate direction in order to cause the +/− error signal to approach zero. In this manner, the AGV 10 will seek the middle of the transport 50, and therefore compensate for any skew in the positioning of the transport 50 in relation to the loading dock. It is possible to use only one sensor in each set if each transport 50 to be loaded is of a known width. In this embodiment, the distance from the one sensor should be subtracted from the known distance that correlates with the AGV 10 being in the middle of the transport 50 to obtain the +/− error signal, which can be used by the steering mechanism of the AGV 10 to guide the AGV 10 in the appropriate direction in order to cause the +/− error signal to approach zero. In another embodiment, the AGV 10 does not track the middle of the transport 50, but instead maintains a specified distance from one of the sides 54 of the transport 50.

The AGV 10 is guided by the secondary guidance system to the intended load position. Preferably, the intended load position is the front-most unoccupied section of the transport 50. In the preferred embodiment, the AGV 10 will continue forward in the approximate middle of the transport 50 until detecting the end 56 of the transport 50 or previously loaded loads on the transport 50. This detection may be accomplished by an appropriately configured pressure sensor or sensors. The pressure sensor could be positioned to be on the end of the fork pairs 16 to detect contact with the end wall 56 of the transport 50 or other load or, in a preferred embodiment, a pressure sensor could be positioned on the other end of the fork pairs 16 to interact with the load when the load itself contacts the end wall 56 or other load. In the preferred embodiment, the AGV 10 slows down to a low speed when it approaches the intended load position, and the AGV 10 detects bumping of the load with the end 56 of the transport 50 or other load by monitoring the drive current of the motor of the AGV 10. As resistance to travel increases (for example, when a relatively immovable object contacts the AGV 10), the current delivered to the electric motor of the AGV 10 similarly increases. This increase in current can be used as the indication the load has reached its intended load position.

Once the AGV 10 has reached the intended load position, the AGV 10 deposits the load. In a preferred embodiment, this comprises lowering the load onto the transport 50 by means of the elevator mechanism 18, and then moving the fork pairs 16 out of engagement with the fork pockets. The step of depositing the load can also include shifting the fork pairs 16 (with the engaged load) outward towards the side of the transport 50 by means of the side-shifting mechanism 22 before depositing the load. In a preferred embodiment, the load is comprised of two independent pallets, each of which is engaged with one of the fork pairs 16 illustrated in FIG. 1. In this embodiment, when the AGV 10 is approaching the intended load position in the direction of travel of the AGV 10, the side-shifting mechanism 22 begins to shift the fork pairs 16 and the engaged independent pallets, outwardly towards the sides 54 of the transport 50 and away from each other. The encoders 23 track the change in position of the fork pairs 16 during this side shifting. In a preferred embodiment, when the encoders 23 detect that the position of the fork pairs 16 is no longer changing, the load is presumed to have contacted the sides 54 of the transport 50, and the AGV continues to travel in the forward direction until detecting the end 56 of the transport 50 or previously loaded loads on the transport 50, as described above. At this point, the load has reached the intended load position and the load is lowered onto the base of the transport 50.

Figure 4:
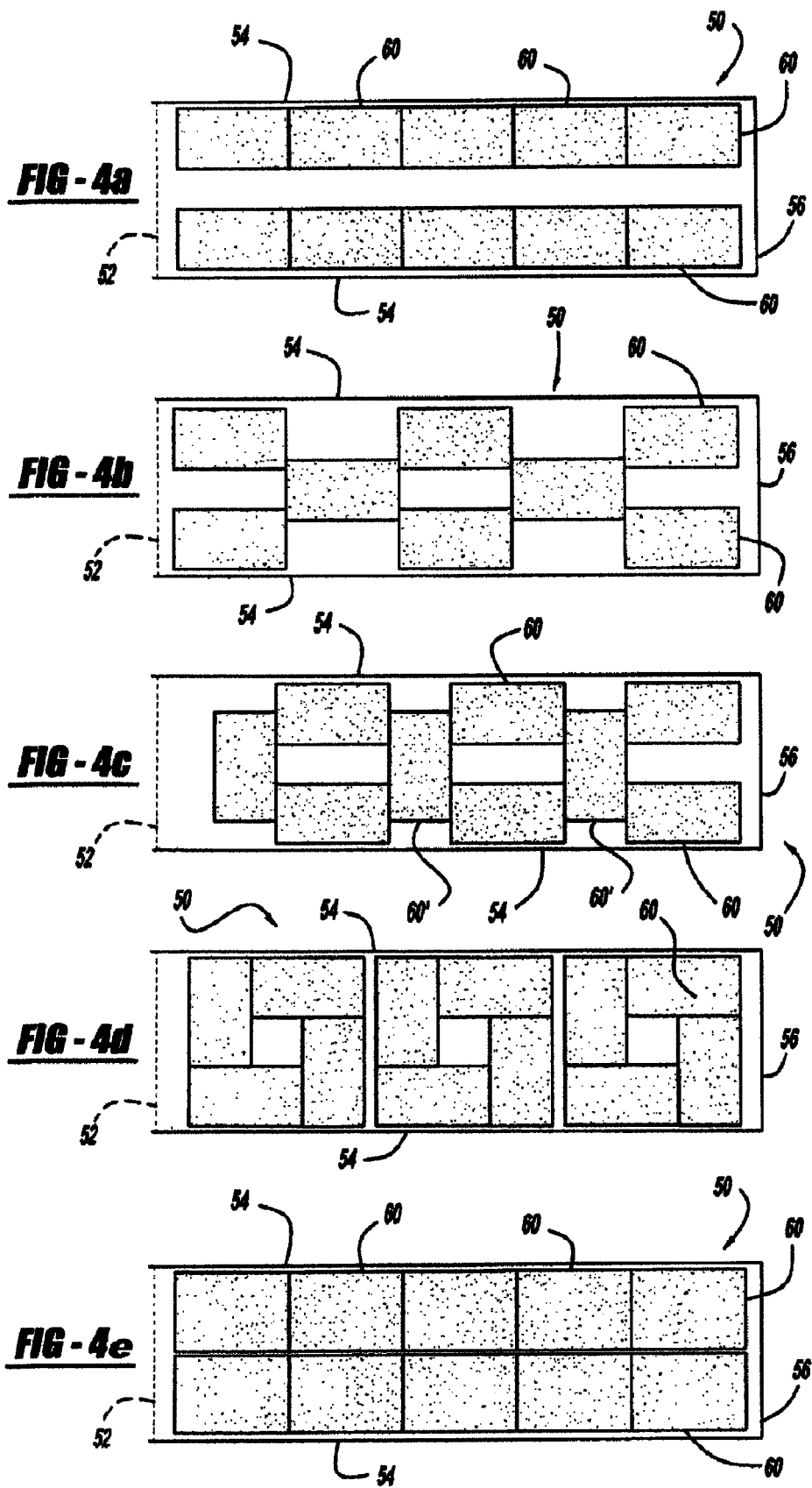
FIGS. 4*a-e* are overhead views of a loaded transport according to the present invention.
Figure 5:
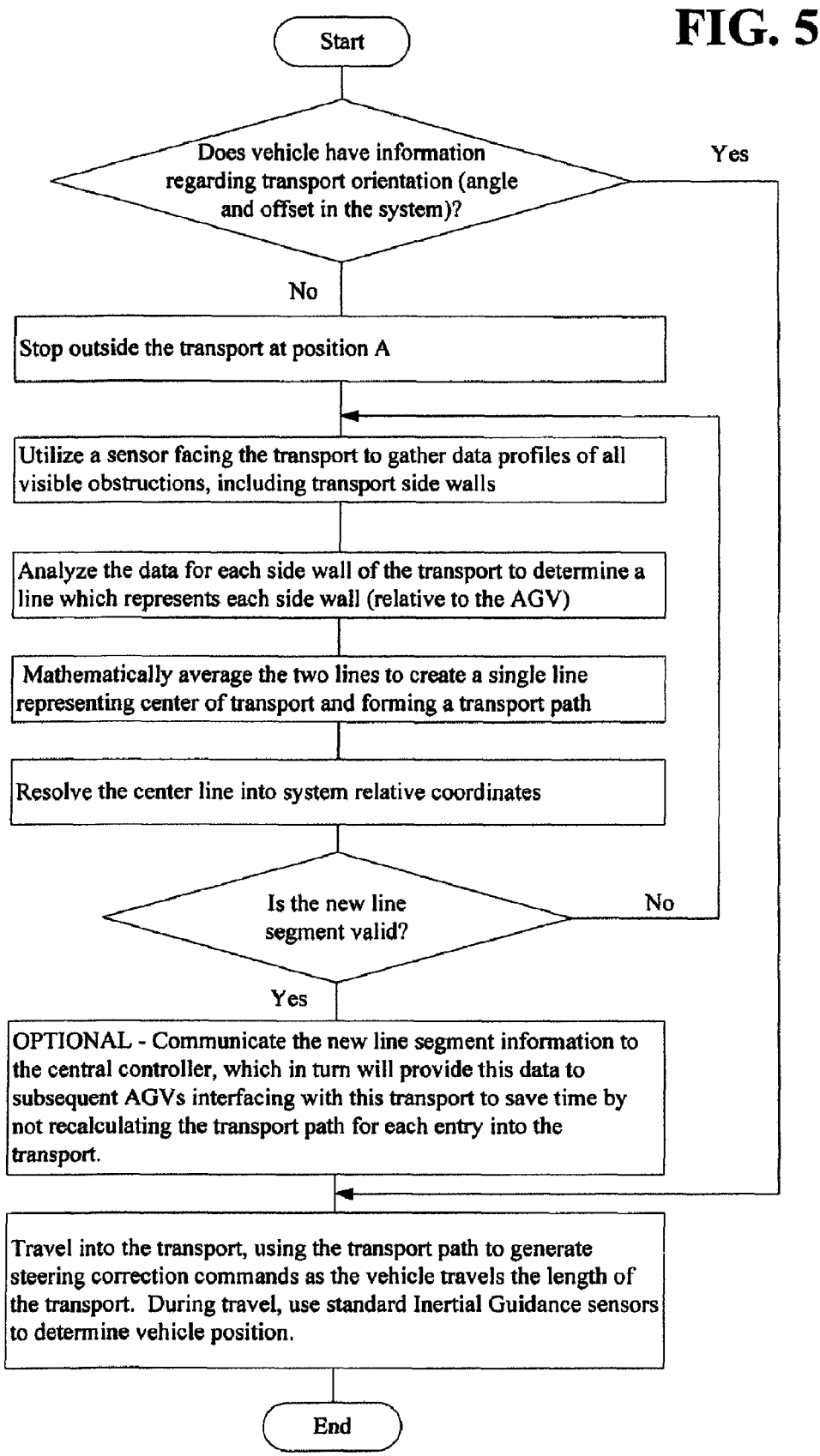
FIG. 5 is an exemplary flow diagram of a loading process.

Various modifications to the embodiments described above can be made without departing from the scope of the claimed invention. For example, an AGV 10 that has only one fork pair 16 can be used with the method of the invention. In this embodiment, the fork pair 16 can be shifted by means of the side-shifting mechanism 22 such that individual loads can be placed at the side 54 of the transport 50. In this manner, the transport 50 can be loaded one load at a time. If desired, the AGV 10 can also alternate the side 54 of the transport 50 on which the load is deposited. Further, this invention allows the AGV 10 to load the transport 50 in any load configuration, e.g., two loads side-by-side from the front to the back of the transport 50 (as in a preferred embodiment illustrated in FIG. 4a), alternating rows of two side-by-side loads and one load in the middle from the front to the back (FIG. 4b), or any other conceivable layout. In the case of asymmetrical loads, the loads can be arranged such that some are rotated with respect to others, as shown in FIG. 4c (in which the loads indicated by 60' are rotated 90° from the alignment of the loads 60) and FIG. 4d (in which the loads 60 are arranged in a "pin-wheel" layout). In the illustrated layouts of FIGS. 4a-d, rectangular loads are shown; however, any shaped load may be used with the present invention.

Because of the flexibility in position for depositing the loads by the AGV 10, the optimum configuration for the loaded transport 50 can be achieved. In a common arrangement, the transport 50 is loaded such that a minimum amount of empty space (i.e., without a load) is achieved, however, for heavy loads it is possible that the weight limit of the transport 50 would be exceeded in such a configuration. In this type of circumstance, or in another event of a less than fully loaded transport 50, the layout of the loads in the transport 50 can be arranged to minimize shifting of the loads during transport 50. In each case, the AGV 10 and method of the present invention can be utilized to achieve the desired loading of the transport 50.

After depositing the load, the secondary guidance system will then be used to guide the AGV 10 back to approximately the same location where the secondary guidance system was first enabled, in a preferred embodiment the threshold 52 of the transport 50. Once at this location, the primary guidance system will then be used to guide the AGV 10 on its travels; for example, to pick up another load. If a track wheel is used, as in a preferred embodiment, the track wheel is lowered to again contact the ground to be utilized by the first, i.e., inertial, guidance system.

In a preferred embodiment, the primary guidance system will continue to track the motion of the AGV 10 when it is being guided by the secondary guidance system. This continual tracking allows for a more precise resumption of guidance by the primary guidance system.

Automatically Unloading a Transport:

The process of unloading a transport 50 is very similar to the loading process described above. The main difference is that it is difficult to ensure that the load to be picked up is in the proper position on the transport 50, and therefore the AGV 10 must be designed to compensate for this and other variability in the position of the load. A preferred method includes the step of guiding the AGV 10 with a primary guidance system to a position near the transport 50, most preferably at the threshold 52 of the transport 50. At this point, a secondary guidance system, preferably including the analog sonic sensors described above, guides the AGV 10 to mate with the load. As described above, the AGV 10 could be modified to allow for a wider range of load positioning by including optical sensors on or near the forks 16 that could be used to detect the fork pockets of the load. When the AGV 10 approaches the load location on the transport 50, these optical sensors could be switched on to find the fork pockets. Based on the detected position of the fork pockets, the AGV 10 would modify its path of travel or, preferably, the forks 16 could be adjusted by means of fork shifters (i.e., the side shifting mechanism 22 and vertical slides 15 described above) that allow for movement of the fork pairs 16 independently of the AGV 10, such that the fork pairs 16 and fork pockets interact. Once engaged, the load could be lifted by the elevator mechanism 18 of the AGV 10. The secondary guidance system would then guide the AGV 10 back to approximately the same position where it began guiding the AGV 10, i.e., the threshold 52 of the transport 50. At this point, the primary guidance system would then be used to guide the AGV 10 on its travels. In a preferred embodiment, the primary guidance system will continue to track the motion of the AGV 10 when it is being guided by the secondary guidance system so that a more precise resumption of guidance by the primary guidance system is possible.

Another embodiment of the present invention allows the use of the primary guidance system to navigate within the transport 50 by determining a transport travel path before the first AGV 10 enters the transport 50. In determining the transport path, the system must determine the skew of the transport 50 in relation to the loading dock as well as any lateral offset of the center of the transport threshold from the center of the loading dock bay 82. In some embodiments, the system also determines the location and relative angle of one of the transport floor and roof. As described above, in the preferred embodiment, the AGV utilizes an inertial guidance system to guide the AGV 10 to the threshold 52 of the transport 50 to be loaded. The threshold 52 of the transport 50 is near the door 55 of the transport 50. Unlike the previously described method, the AGV 10 does not need to switch to a second guidance system, but instead, near the threshold 52 of the transport 50, the system determines a transport travel path for the AGV 10, for example by using a sensor having a moving beam laser or optical system, to scan the transport 50 such as by determining the location of the side walls of the transport 50. In some embodiments, the sensor may also scan at least one of the transport roof 58 and transport floor 57. With the transport travel path determined, the primary guidance system, such as an inertial guidance system, can be utilized to load or unload the transport 50 in a manner very similar to that described in the examples above.

Figure 8:
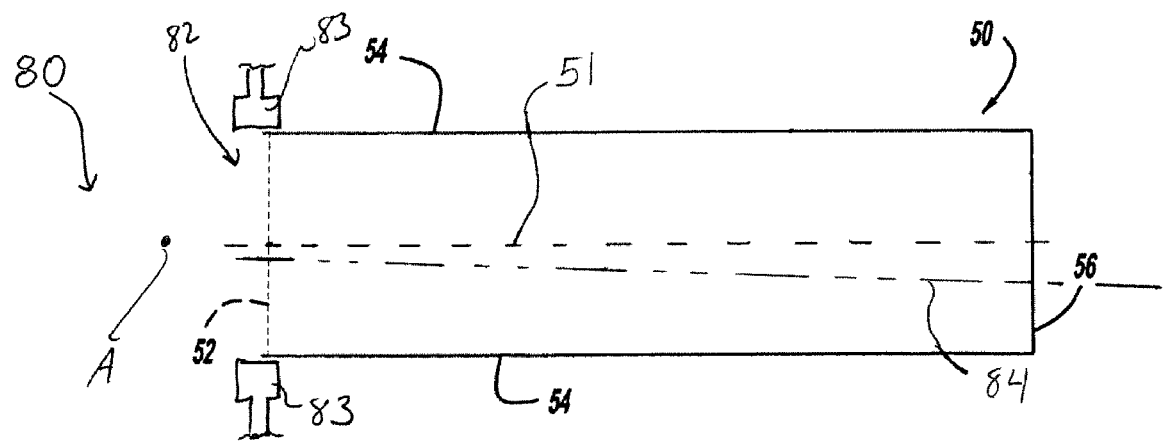
FIG. 8 is an overhead view of the transport relative to the AGV system and loading area.
Figure 9:
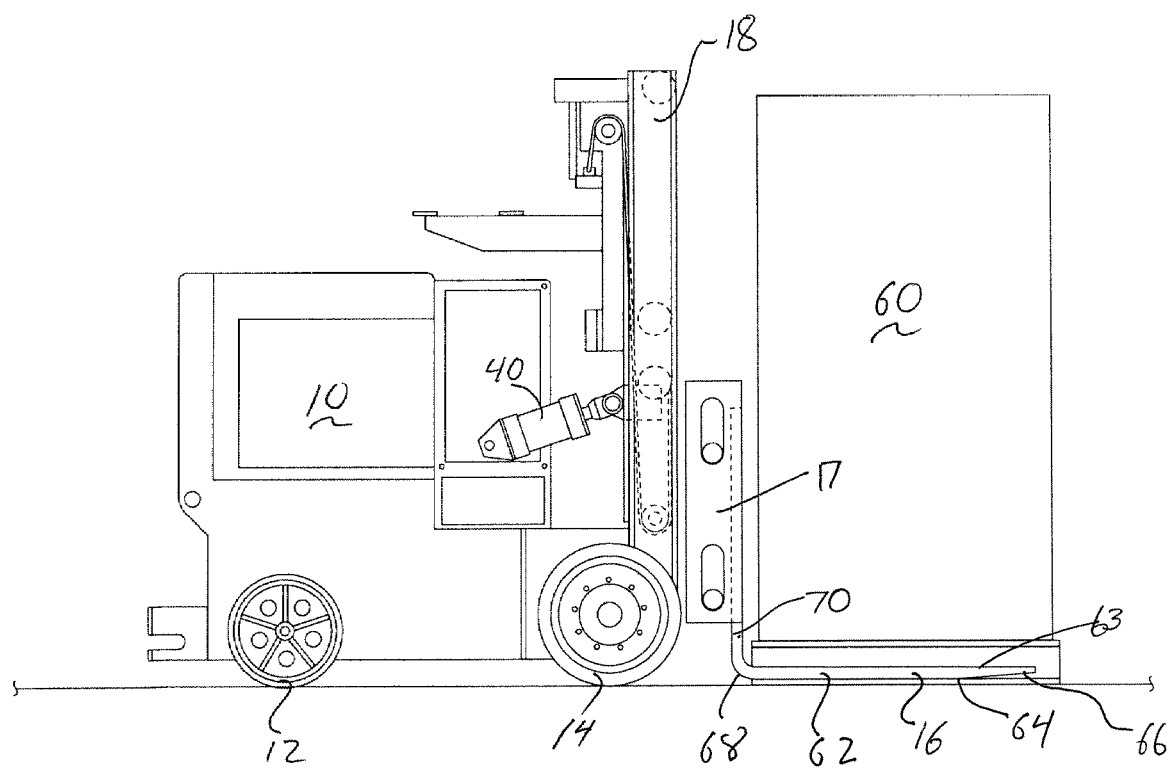
FIG. 9 is an illustration of an exemplary AGV carrying a load.
Figure 10:
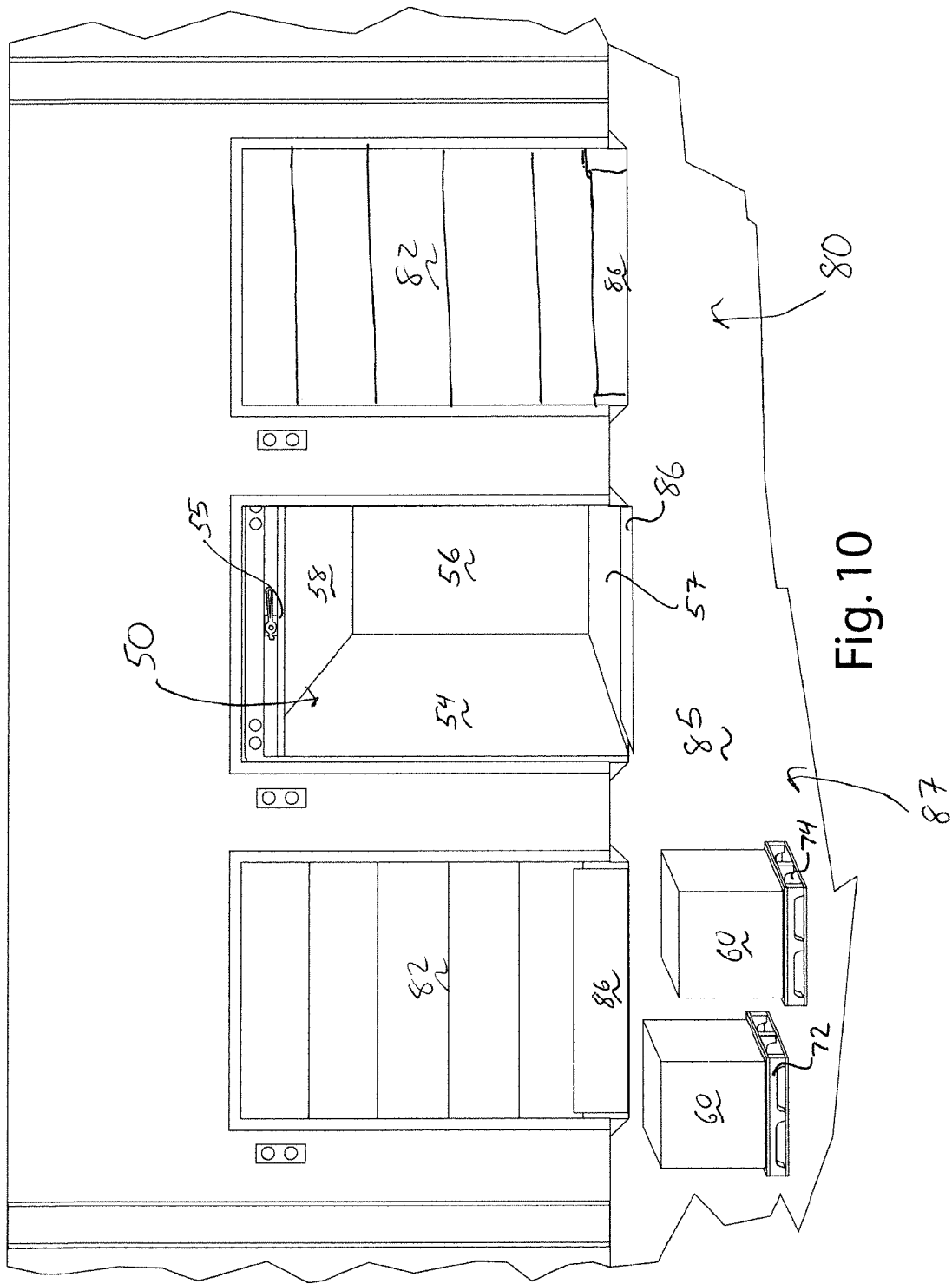
FIG. 10 is an illustration of a loading area, including transports within loading bays being loaded.
Figure 11:
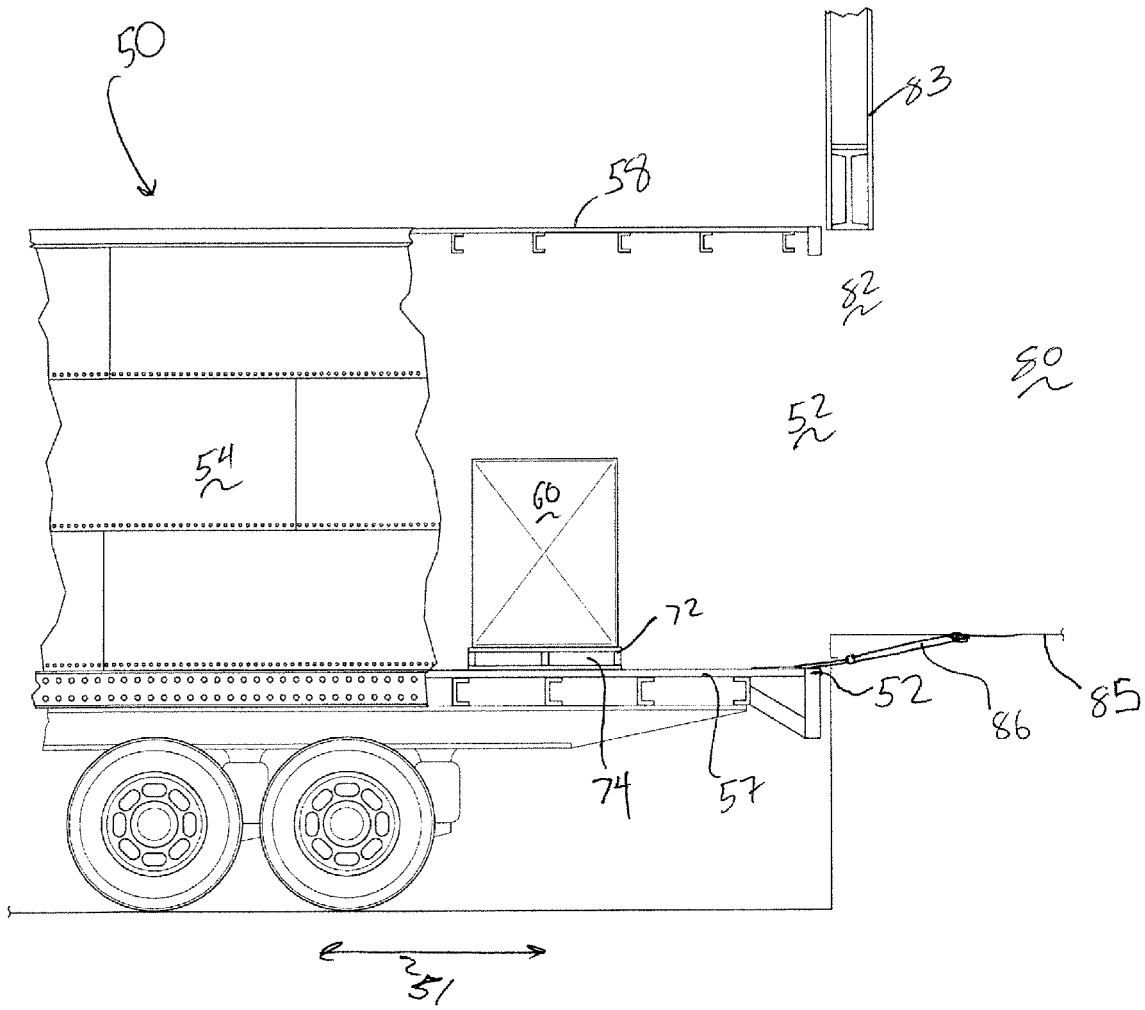
FIG. 11 is a partial cross-section showing a transport having a floor that is lower than the floor of the loading area.

The AGV 10 may use a single sensor 100 or multiple sensors to create a data profile of the interior of the transport 50 from outside the transport 50. In this alternative embodiment, the data profile of the transport 50 is created before the majority of the AGV 10 enters the cavity formed by the transport 50 into which the loads 60 will be placed and more particularly before the load 60 enters the transport 50. Creating a data profile of the transport 50 to identify deviations from the expected placement, such as lateral displacement, skewing of the transport 50, vertical displacement and the angle of the transport floor 57, allows the AGV 10 to easily maneuver to the best path for placement of the load 60 within the transport 50, before the AGV 10 enters the transport 50. More specifically, due to operator error, transports 50 or in particular semi-trailers into which loads 60 are placed are typically misaligned from an optimal position when backed up to a loading area 80 and are almost never aligned exactly the same in lateral offset or skew. Loading areas or docks 80, include bay openings 82 defined by the loading dock walls 83, which are wider than the transport width to allow for this operator error. However, this allowed operator error can cause problems for AGVs 10 in systems that use loads 60 that substantially fill the width of the transport 50, as illustrated in FIG. 4e. The vertical displacement of the transport 50 relative to the loading facility floor 85 may also cause problems with tall loads for the AGV 10. The vertical displacement as well as the angle of the transport floor, relative to the supporting surface of the AGV, may also cause problems for the AGV with placing the loads near the threshold 52 of the transport 50. Therefore, the AGV 10 uses the sensor 100 to create a profile of the transport 50 before the loads 60 enter the transport, allowing the AGV 10 to enter the transport 50 without contacting the load against the side walls 54, even when the transport 50 is laterally displaced from the expected position, as illustrated in FIG. 8. As illustrated in FIG. 8, if the operator properly aligned the transport 50 the longitudinal axis 51 of the transport 50 would be aligned with the expected longitudinal axis 84. However, in FIG. 8, not only is the transport 50 displaced laterally from the expected longitudinal axis 84 at the opening 52 or threshold of the transport but also is skewed at an angle from the expected longitudinal axis 84. As illustrated in FIGS. 9-11, the transport may also be vertically displaced or be angled relative to the loading facility floor 85 or dock ramp 86.

While the AGV could use the sensor 100 as described in U.S. Patent Publication No. 2006/0276958, entitled Inertial Navigational Guidance System For A Driverless Vehicle Utilizing Laser Obstacle Sensors, to avoid obstacle contact with the side walls 54 of the transport 50 upon entrance to the transport 50, and then use the previously described second guidance system to seek the middle of the transport 50 by subtracting the distance from a pair of sensors to create a +/− error signal, to simplify the AGV, reduce manufacturing costs by eliminating additional sensors, and decrease loading times, the present invention uses the sensor 100 to create a data profile of the transport 50 that addresses both lateral displacement of the transport 50 as well as skew or the angle of the transport 50 in a single step. The second 100 in this single step may also determine the vertical displacement as well as the angle of the transport 50. This method also eliminates continuous calculations and adjustments required by a two sensor system to adjust for skew of the transport, thereby allowing quicker operation of the AGV 10 and reduced loading times. Any reduction in loading times of transports 50 may allow for reduction of the number of AGVs used in the system, thereby significantly reducing the initial cost of the system as well as the ongoing operational cost.

The use of a sensor 100 to create a transport path for the primary guidance system to follow eliminates the need for a second guidance system in the preferred embodiment, but in some instances, a second guidance system will be used. The AGV 10 uses, in the preferred embodiment, the same navigation system to navigate to position A as well as to navigate along the transport path. As stated above, this guidance system may be any known system, such as inertial guidance, wire guidance, visual guidance, tape guidance, laser target guidance, or laser guidance, including laser guidance. However, if a wire guidance system, tape guidance, or laser target guidance is used, an inertial guidance system, dead reckoning guidance system, visual guidance system, or laser guidance system may also be included for travel in the transport. As previously described, in particular in paragraphs [0023]-[0032], the AGV 10 will use the primary guidance system to operate as desired in obtaining loads 60 and then guiding the AGV to a point such as illustrated position A in FIG. 8 outside of the transport 50.

Position A is outside the transport and is variable in distance from the transport threshold 52 depending on the size of the loads 60, the maneuvering capabilities of the AGV 10 and, if the sensor 100 is located on the AGV, the sensitivity of the sensor 100. More specifically, position A may be located at any distance or location outside the transport 50 that allows for an accurate data profile of the transport 50 by the sensor 100, if the sensor 100 is located on the AGV, to determine accurately the location of side walls 54 and thereby determine if and by how much the transport 50 is laterally displaced from the expected position, and the skew or angle of the transport as illustrated in FIG. 8. From this data profile a transport path may be calculated for the AGV to follow. In some embodiments, two or more sensors are used to ensure an accurate and full profile of the transport. For example, one sensor may be located at a low point on the AGV, such as being able to operate under the raised load and one at a high point, such as being able to operate over the load. If more than one sensor is used, they may be located on each side of the AGV or any other desired location.

It is important to note that the data profile of transport allows the AGV, and in some embodiments a central controller, to place the transport 50 into the operational system and the operational paths or routes of the AGVs by determining and adding an optimal path into and out of the transport for loading and unloading a transport. The system may also coordinate the movement of the forks 16 and load 60 with the travel of the AGV in and out of the transport to prevent any interference with operation near the threshold 52 of the transport 50. Of course, one skilled in the art would recognize that a human operator may identify and provide data to the system regarding the availability of the transport to the system and the expected destination of that transport so the AGV system knows when to load a particular transport 50 and with what loads 60 and how many loads 60. It should also be recognized that even though the term "expected position" or "ideal position" may be used when referring to the displacement of the transport 50 from optimal positioning, the AGVs or system operating the AGVs will not necessarily include data regarding the expected positions. Instead, the sensor 100 creates a data profile of the transport, and then calculates and adds the optimal path or transport path into the system for the AGVs to follow until the transport is filled and removed from the system. Therefore, the controller or AGVs may add travel paths into and out of a transport 50 at each loading bay from the position A, which the system has identified in relation to each loading door as the optimal point to switch between using the operational system travel paths or routes in the system to these added segments or additional travel paths that are calculated for each transport. The AGV follows the transport path into the transport 50 from position A, and when the load is deposited, the AGV travels back to position A and switches from using the data profile or route determined within the transport 50 to the standard system travel paths or routes for its next destination.

The position A is preferably determined in set up of the system as the closest point to the transport threshold 52 that allows the maximum sized load 60 to remain outside the trailer threshold 52 as the AGV 10 maneuvers to align itself with the optimal route into the trailer, which is typically the longitudinal axis 51 of the transport 50. Placing the AGV 10 as close to the transport 50 as possible typically allows for a better data profile of the transport 50 by the AGV, if the sensor 100 is located on the AGV.

For example, to allow enough maneuvering room for the AGV to align itself with a desired travel path into the transport 50 before the loads 60 cross the opening 52 or threshold of the transport 50 while optimizing the sensor position, if the loads 60 have an approximate depth of three feet and the average maneuvering space needed by the AGV 10 to properly align itself with the transport 50 is approximately three feet, the expected stop position outside of the transport 50 would be approximately six feet or slightly greater from the threshold 52. If the sensor 100 is not located on the AGV, it may be preferable to locate position A at a greater distance from the threshold to allow more room for maneuvering, which then typically allows higher speeds as the AGV has an easier time adjusting its position and travel path to match the desired transport path before the load 60 enters the transport 50 and therefore reduces loading time.

If the AGV 10 does not have in the onboard controller or a central controller directing the AGV information regarding the transport 50 orientation as it fits within the overall system in which the AGV 10 operates, or a desired calculated transport path, the AGV 10 will create an image, map, or other data profile on the trailer from which the orientation of the transport 50 may be determined. Of importance in determining the orientation of the transport 50 is how much the opening 52, in particular the side walls 54 on each side of the opening 52, are offset from the expected position (typically the center of the loading bay 84), or more particularly, the location of the side walls 54 so that the entering load 60 does not contact the side walls 54, as well as the angle or skew of the trailer as also determined by the side walls 54. Although not required, the sensor 100 may also be used to determine the position of the end wall 56 when loading an empty transport, or if the transport arrives partially full, the distance to any pallets or loads in the transport. The position of the end wall 56 or any existing loads allows the AGV 10 or system controller to calculate how far the AGV 10 must travel into the trailer to place the first load 60. Calculation of the length of the transport path allows the AGV to travel further into the trailer before the load is lowered and then pushed to a final position in the preferred embodiment. By minimizing the pushing distance of loads in the transport, the battery charge on the AGV 10 will last longer before requiring a recharge. However, other optional methods may be used to determine how far into the trailer the AGV must travel when placing the load 60 such as the AGV 10 knowing the approximate length of the trailer and traveling.

In determining a transport path for the AGV 10 into the transport, the AGV 10 typically gathers a data profile of the transport and then analyzes the side walls 54 to determine a travel line approximately along the actual longitudinal axis of the transport. More specifically, typically the AGV 10 approaches the loading bay 82 to a position along the expected longitudinal axis 84. The sensor 100 then images the transport 50 to create a data profile to determine an expected travel path which is typically along the actual longitudinal axis 51 of the transport 50. This actual longitudinal axis is typically calculated by mathematically averaging the side walls 54 of the transport to create a center travel path into the transport 50.

When the AGV 10 is at position A, if the sensor 100 is on the AGV, the AGV w stop and profile the transport 50 with sensor 100 or at a position prior to position A. If position A is removed sufficiently from the transport threshold 52 such that position A is a distance greater than the minimum distance required to maneuver, before the load 60 enters the transport 50, the AGV may be able to profile the transport 50 with sensor 100 without stopping. Position A in FIG. 8 only refers to the most ideal position to sense the interior of the transport and/or switch to the AGV 10 following a transport path and where to maneuver into the correct position for following the transport path, including entry into the transport without the loads 60 contacting the side walls 54. Therefore, as compared to the previously described embodiment where the sensors 20 and 30 were inside the transport when a switch between guidance systems occurred, in the present embodiment the sensor 100 is fully outside of the transport while a new route into the transport is calculated and a switch is made to use that route. Therefore, the first AGV to position A, if the sensor 100 is on the AGV, will obtain a data profile of the transport 50. The AGV or a central controller uses the data profile to calculate an optimal route into the transport 50 (the transport path) and optimal placement of the load 60, for which type of load 60 the transport 50 is receiving and the width and potentially the length of the transport 50. The AGV then follows this transport path into the transport 50 from position A, deposits its load 60, and then follows the transport path out of the transport 50 back to position A. At position A, it switches from the transport path to a route used in the system for the next destination.

Figure 6:
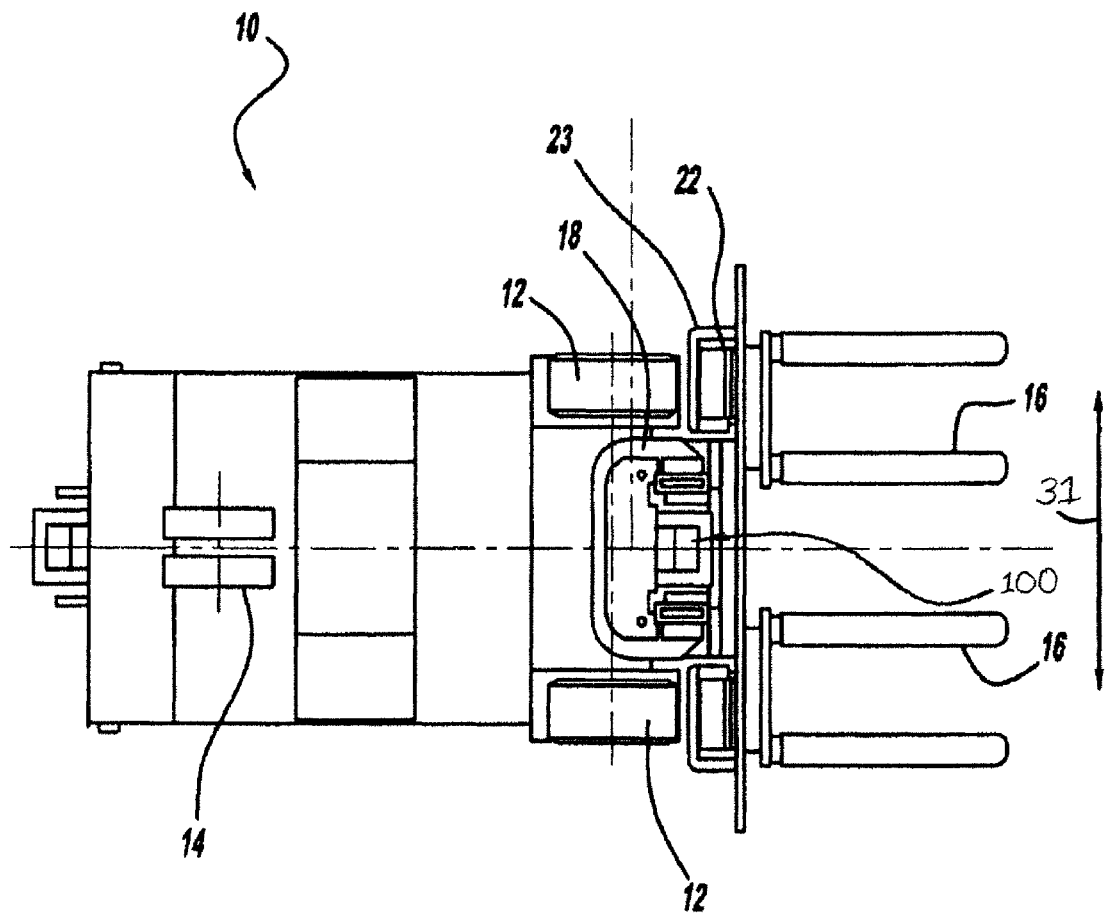
FIG. 6 is an overhead view of an alternative AGV.
Figure 7:
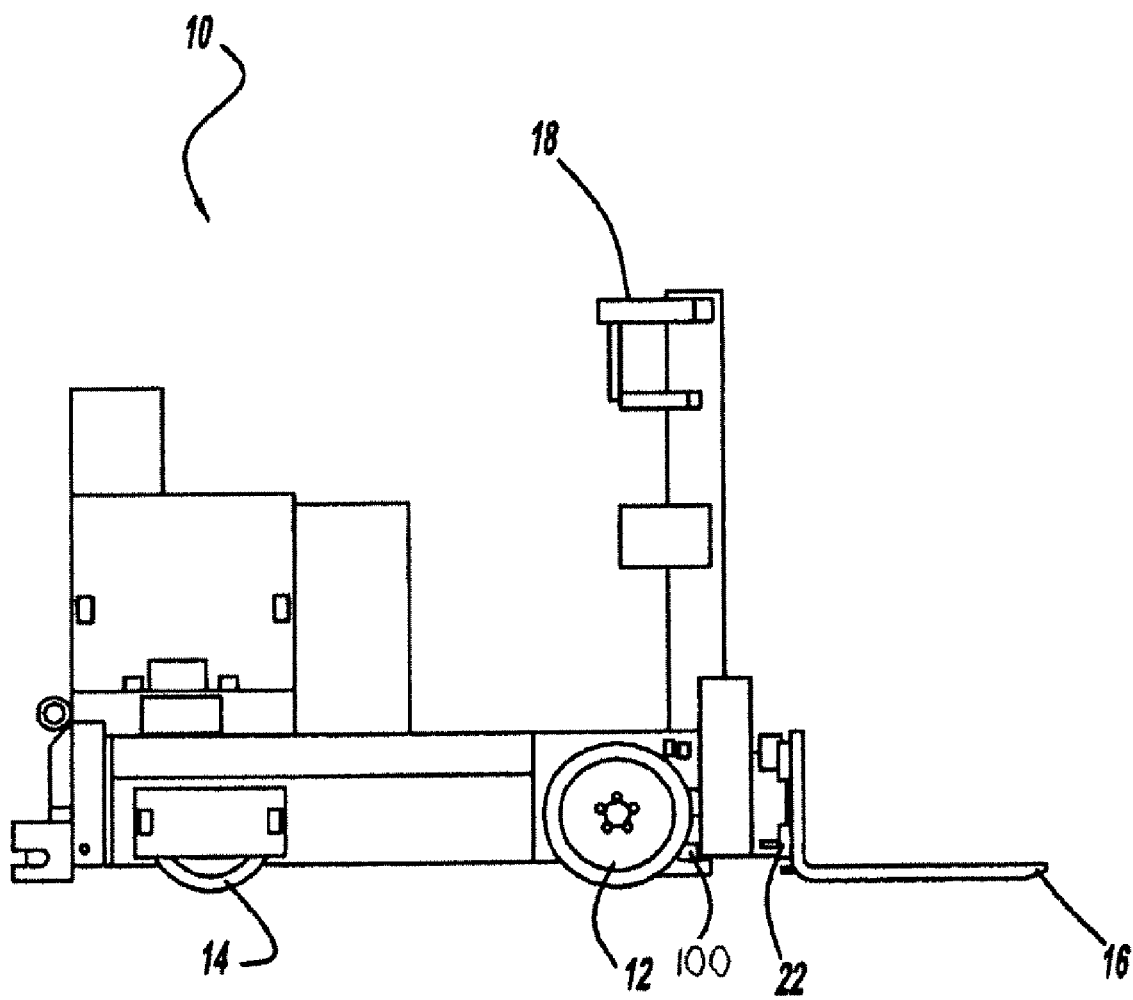
FIG. 7 is a side view of the alternative AGV.

The sensor 100 is preferably a laser sensor or any sensor capable of creating an image of the interior of the transport such as sensing the opening 52, side walls 54, and end wall 56 of the transport. In certain instances, especially when tall loads are being loaded into the transport, the sensor 100 may also provide information regarding the roof of the transport (not illustrated) to ensure that as the AGV enters the transport with enough clearance maintained between the top of the load 60 and the roof of the transport. As illustrated in FIGS. 6 and 7, the sensor is centered on the AGV between the fork pairs 16. This placement generally would allow measurement of the side walls 54, as well as height of the ceiling of the transport 50 by seeing between loads 60. However, depending on various operational needs, the sensor 100 may be located in other positions. For example, some factories have large objects, such as tables, furniture, or other devices that use pallets, that are twice as wide or long as normal. Therefore, to allow the sensor 100 to see the ceiling, if the pallet is a double wide pallet, or the side walls 54 if two double long pallets are arranged on the AGV forks, other locations on the AGV may be utilized for placement of the sensor 100.

In the preferred embodiment, the second AGV to arrive is already provided with information regarding the transport orientation within the system or more particularly the transport path from position A into the transport and back to position A once the load is deposited. As the AGV already knows the transport path to follow that the previous AGV added to the system, the AGV may pass through position A into the transport without stopping or even sensing the transport 50 as it switches between routes that the AGV is following. To maximize efficiency, the system may switch to the desired transport path before position A to allow greater maneuvering time and typically a greater speed at which the AGV may maneuver as it has more time and distance to match its route to the desired transport path. For example, an inertial guidance system is used to bring the AGV to position A as illustrated in FIG. 8. Before or upon reaching position A, the central controller provides the desired transport path to the AGV, which then continues to use the inertial guidance system to align itself with and then follow the transport path to enter the transport and place the load 60 in the proper position. The AGV uses the inertial guidance system to follow a reverse path back to position A, where it switches to a path for the new destination.

Of course, each AGV may include a sensor 100 and controller which individually on the first time the AGV approaches the transport, or each time creates the data profile and calculates the desired transport path, typically along the actual longitudinal axis 51 of the transport 50 for placement of the load 60. Each subsequent time an AGV approaches the transport 50 for placement of a load 60, it may either recalculate the desired travel path or may use the previously determined travel path. Having at least the first two or three AGVs calculate a transport path to follow allows averaging of transport paths and data profiles for a more accurate route. However, as the transport 50 fills with loads 60, reanalyzing each time before the AGV enters may be counterproductive as the sensor 100, when mounted on the AGV, typically sees less of the side walls and therefore has a greater chance of introducing error into the desired travel path as it is recalculated, because the data profile has less side wall length to measure.

As an optional step, when the sensor 100 scans the interior of the trailer 50, a sensor may also scan fixed objects within the loading bay area 80 to calibrate its position within the system. More specifically, the AGV 10 may travel to position A in FIG. 8, and when scanning the interior of the transport 50, determine, based upon the location of the loading dock walls 83 and loading dock bay 82, that it is ½ inch off from the position A. The AGV after traveling into the transport 50 to place the load will return to position A; however, when it returns to position A it will adjust for the previous discrepancy between the expected position and the actual position. Therefore, the AGV 10 allows for easy recalibration of its position without additional steps or calibration at other points within the system. In the primary embodiment, once the new transport path is determined along the longitudinal axis 51 of the transport 50, the AGV uses its inertial guidance system to travel into the transport 50 and place the load 60. Using the inertial guidance system instead of a separate or different guidance system allows for lowering manufacturing costs in creating the AGV without giving up any benefits. However, the present system can use a number of other guidance systems such as dead reckoning, laser guidance, visual guidance, tape guidance, and wire guidance. In using the inertial guidance system, the gyroscope is keyed to motion in the horizontal plane and not to vertical motion, and therefore any vertical misalignment of the transport 50 relative to the loading dock will not affect the inertial guidance system as the AGV enters the trailer 50. One skilled in the art would recognize that in some embodiments it may be beneficial for each AGV to create its own data profile of the transport such as to remove any calibration issues or to ensure that taller loads do not contact the top of the transport due to settling of the transport as weight from the loads is added. In some embodiments, when it is desirable to recalibrate the inertial guidance system at specified points, it may be desirable to create a data profile of the transport as well as specified fixed locations on the loading area 80 to provide a calibration of the AGV relative to the system.

One skilled in the art may recognize that the AGV generally travels forward with the forks and loads 60 located in the rear of the vehicle. Therefore, before reaching position A in FIG. 8, the AGV generally maneuvers around so that the loads 60 or forks 16 face the transport 50. The AGV then, if needed, senses the transport to create the data profile and transport path and travels into the transport 50 with the loads 60 entering first. Upon placement of the loads 60, the AGV travels from the transport back toward position A and switches between profiles or systems such that the vehicle generally does not slow down or stop as it continues to pick up its next load when exiting the transport. Of course, the sensor 100 in some instances may be located on the side opposite of the forks to allow a clear view for the sensor 100 to create a data profile of the trailer. In this embodiment, position A would be located a sufficient distance from the threshold 52 for the AGV to rotate 180°, align itself with the transport path, and enter the transport 50 with the load first, without the loads 60 contacting the side walls 54.

As the AGV loads the vehicle to maximize placement of the loads, generally the AGV will lower the load as it reaches the end of its calculated path and push the load for the remaining distance along the floor of the transport. By using a current sensor on the drive wheels it can be determined when the load has contact with the previous load and is tightly placed against the previous loads on the transport.

In a variation of the above embodiments, the present invention may also perform regular updates, such as updating at specified intervals as the AGV travels between the load position and position A. Regular updates correct for any wheel slip errors, yet minimize the additional processing requirements associated with performing continuous updates of position and the efficiency reduction in loading a transport in continuously correcting the path of the AGV in response to the continuous updates. The interval between regular updates may vary depending on the type of primary guidance system and accuracy of the primary guidance system. The interval between regular updates is typically set to a particular time, travel distance of the AGV, or other factors such as a combined time and distance factor. Minimizing the number of updates prevents unnecessary processes, including incremental and unnecessary guidance corrections. Numerous incremental course corrections may reduce the speed and efficiency with which a transport may be loaded, as it may reduce the speed of the AGV as it loads the transport 50. More specifically, by adding a few position checks and updates to the method, as the AGV moves from a position outside the transports, such as from position A, to an intended load position (or unload position if the transport is being unloaded), allows maximum efficiency. It is important to note that the AGV continues to use the primary guidance system and that the updates update this primary guidance system. The system preferably does not switch to the second guidance system as described above in regards to one of the above embodiments. Therefore, this extra method step allows the system to easily correct for guidance errors caused by the limitations of the guidance system or environmental errors.

Many guidance errors occur from wheel slippage caused by moisture, ice, fluids, oil, or other substances on the floor of the transport. As various AGVs load a transport, over time these substances may be transferred to a dock ramp extending into the transport or the loading bay floor. For example, transports are commonly used in multiple facilities with various products shipped therein, and it is common for transports to over time accumulate various slippery substances which may cause guidance errors. By performing regular, but not continuous, updates, the system corrects for any potential errors while minimizing the necessary processing power, yet maximizing the efficiency and speed with which the AGV loads the transport.

The system may use any sensors, such as the above described distance measuring sensors 20 or 30, or more preferably the sensor 100. Use of the sensor 100 as the AGV 10 enters the transport 50 is particularly advantageous as it already knows its planned travel path and may easily compare the sensor data with the data received at position A from at least the first AGV canning or profiling the interior of the transport.

If the AGV 10 includes an inertial guidance system as its primary guidance system, the sensor 100 would at regular intervals, such as at every two to three wheel rotations, activate the sensor 100 to image the interior of the transport and then provide this data to the controller for processing. The sensor 100 may be configured to provide a profile of the position of the AGV 10 three-dimensionally, or at least two-dimensionally, within the transport. In comparison, each of sensors 20 and 30 provide a one-dimensional profile within the transport. Therefore, it is highly advantageous to the guidance system to make at least two-dimensional updates to error check the position of the AGV. In embodiments where the sensor 100 is the sensor for the primary guidance system, such as a Ladar, optical, or laser guidance system, the guidance system may dead reckon between the updates. This eliminates the need for expensive inertial sensors on the AGV.

In some embodiments the system may not include sensors 100 on the AGVs, but instead place the sensors in the vicinity of the loading dock where they are not in the way of the AGVs 10 while yet are able to see sufficiently inside the transports 50. For example, a sensor 100 may be located approximately six feet outside of each loading bay facing the transport 50 such that upon opening the load bay door and the door to the transport 50 the sensor may automatically image and create a data profile of the actual location of the transport including offset, skew, and angle of the floor of the transport 50 relative to the expected location. This updated data profile is then provided to the central controller which would provide travel routes or transport paths for each AGV and therefore eliminate the step of at least the first AGV, creating a data profile of the location of the transport and then updating the central controller and determining a travel path for the AGV. Therefore, the central controller can create the desired travel path and the AGV may travel to position A using its inertial guidance system using the standard data profiles for the vehicle travel path, and upon reaching position A, continue without stopping, or in most cases, even slowing down into the transport 50 as it switches data profiles at position A from an expected travel path to the actual travel path into the transport 50. The sensor, if located external of the AGV vehicle, may be located inside of the loading bay area 80 or outside of the loading bay, such as being positioned over top of each trailer or between each trailer. To provide an updated data profile for the AGV, generally only the skew of the transport 50 as well as the offset laterally needs to be determined.

While the AGV has been illustrated in the figures as being a vehicle having a double set of forks such that it may carry a pair of pallets into the transport, in some instances vehicles having a single set of forks may be used, and may determine for each different pass into the transport a new transport path for placement of the load side-by-side.

The present invention is particularly advantageous for extremely wide loads that have minimal clearance between each side of the pallets and the side walls of the transport, especially in double pallet systems. Using the calculated transport path, it is expected that an AGV 10 may enter a transport with less than ½ inch between the load and the side walls on each side and travel to the expected position of placement of the load 60 without encountering the side walls of the transport 50.

The above described system may also be used to automatically unload a transport. The process of unloading a transport is substantially similar to the process of loading the transport described above. However, in a transport 50 which is completely full with a pallet placed proximate to the opening of the transport 50, the AGV may unload this pallet without sensing the transport 50 to create a data profile. Once the first pallet is removed or the transport 50 does not include a full load, the AGV may sense side walls of the trailer and location to determine the skew and lateral offset of the transport 50. As loads 60 are continually taken off the AGV, each subsequent AGV may create a data profile of the trailer to reduce error in the data profile due to the limited amount of transport side walls that may be measured initially by the sensor 100 on a partially loaded transport. As each pallet or load 60 is removed from the transport 50, more portions of the side wall 54 are visible to the sensor to create a more accurate data profile. Once the error between the previous and subsequent data profiles is beneath a threshold level, the system may determine the skew and offset of the transport as well as the desired transport path for each subsequent AGV. To fine tune alignment once within the trailer due to misplacement of pallets on the trailer, any type of pallet pocket sensing system known in the art may be used to align the forks to fit within the pallet pockets. In the embodiments where the sensor 100 is located remote from the AGV such as being hung from the ceiling of the loading area 80, in unloading a transport the sensor 100 may be able to see over the tops of the loads 60 to create a complete data profile with minimal errors of the interior of the transport to accurately determine the skew and lateral offset of the transport even for fully loaded transports. Locating the sensor off of the AGV vehicles for unloading a transport provides for a more efficient system, as each AGV does not need to create a data profile of the transport 50.

In the embodiments where the sensor 100 is not located on the AGV, the system may also, similar to systems where each AGV includes a sensor, make regular updates to error check the actual position of the AGV against the expected position of the AGV, as determined by the guidance system. In general, the system as described above re-profiles the transport 50 at regular intervals as the AGV moves from position A to the intended load position, but uses a sensor remote from the AGV. Therefore, from the sensor data, as compared to the original profile of the transport, the actual position of the AGV 10 may be determined. Any deviations in position may be corrected, by the system providing data regarding the variance to the AGV.

When the sensor 100 is located on the AGV, it is preferable to place the sensor in a position such that the sensor may see either under or over the loads 60. As the types of loads 60 may vary between installations, it is preferable to place the sensor lower on the vehicle to see under the load 60 and to sense the interior of the transport 50. Typically this type of placement would be approximately at least four to six inches off of the ground, with an expected preferred position of approximately in the center of the AGV (from side to side) on a dual fork AGV and approximately seven and a half inches off of the ground. Of course, the sensor can be located anywhere it would receive an acceptable reading of the location of the side walls 54 of the transport 50, preferably including the end walls of the side walls, defining the opening to the transport 50. With the sensor 100 placed under the normal carrying position of the loads 60, the AGV may create a data profile of the trailer 50 while the AGV vehicle is moving, and therefore may switch to an updated travel path determined by the new data profile provided by the sensor at position A without stopping the AGV.

As described above, using the sensor 100 to determine the relative positioning of either the transport floor 57 or transport roof 58, allows additional options with end of transport loading, such as the last couple of pallets or loads 60 inward from the threshold 52 of the transport 50. While the above methods for loading and unloading a transport 50 work well for all types of transports, sometimes the loading and unloading of the loads 60 near the end of the transport 50 may be difficult. More specifically, as illustrated in FIGS. 9-11, if the supporting surface on which the majority of the AGV 10 rests is angled relative to the surface on which the load 60, specifically the pallet 72, is to be placed or removed, difficulty may occur due to the pallet forks 16 on the AGV 10 interfering with the pallet 72 as the forks are removed from or inserted into the pallet 72. The pallet 72 includes a pallet pocket 74 into which the forks 16 are inserted to lift the load 60. After the load 60 is brought to the desired position, the forks 16 are removed from the load 60 after the load is placed. When the load 60 is at rest on a surface, such as the transport floor 57 that is angled relative to the surface on which the AGV 10 rests, such as the loading bay floor 85 or dock ramp 86 as illustrated in FIGS. 9-11, the AGV may have difficulty in precisely placing the load and then ensuring that the load remains in the placed position as the AGV removes the forks from the pockets, or when unloading the transport 50, difficulty in inserting the forks into the pocket to pick up the load 60. The pallet pockets 74 are narrow, so even at slight differences between surface angles, the fork tip 66 may engage one of the upper or lower surfaces of the pallet pocket 74 while the portion of the horizontal segment 62 nearest to the transition section 68 engages the other of the upper or lower surface of the pallet pocket 72. It may be easily understood from the above description and the illustrated figures that this engagement may cause problems during operation at the threshold or end 52 of the transport 50. More specifically, the loads further in the transport are less of a problem because as the AGV enters the transport, the wheels 12 and 14 become positioned on the transport floor 57 and therefore the AGV supporting surface is the same as the load supporting surface. Therefore, it may be seen from the illustrations that the pallets one or two pallets inward of the door 55, or threshold 52, may have problems as the AGV is attempting to place a load on the transport floor 57 while the AGV 10 remains on the dock ramp 86 or loading bay floor 85, which may be angled relative to the transport floor 57.

As described above, when the AGV reaches position A, the sensor 100 may scan the transport to determine at least one of the transport floor 57 or transport roof 58. As the transport roof 58 and transport floor 57 are generally parallel, generally only one of these surfaces needs to be determined for the AGV to determine the relative height of the transport floor 57 to the loading bay floor 85 as well as relative angle of the transport floor 57 to the loading bay floor 85. In addition, when the sensor 100 scans a position of the transport 50, it may determine the relative position of the transport 50 to the loading bay opening 82 or the dock walls 83. This determining of the position of the transport 50 relative to the dock walls 83 in conjunction with the relative angle and height difference to the loading bay floor 85 of the transport floor 57, allows the AGV 10 or a system controller to determine the relative angle of the dock ramp 86 extending into the transport 50. The AGV may further determine, if desired, how far the dock ramp 86 extends into the transport. Therefore, to place loads 60 near the end of the transport 50, the system would follow the above described guidance systems and determine the relative angle and relative vertical displacement of the transport floor 57 to the load bay floor 85. If needed, the AGV also determines the relative position and angles of the dock ramp 86.

With this relative positioning of the transport 50 determined by the AGV 10, the AGV 10 may enter the transport 50 with a load 60 lifted to the desired height to ensure that the pallet 72 does not contact the transport floor 57 or transport roof 58, as the AGV 10 is situated on an angle on a supporting surface that is angled relative to the transport floor 57. With the load 60 in the desired position, the AGV 10 may tilt one of the elevator mechanisms 18 or fork carriage 17 using the tilt mechanism 40. A tilt sensor (not illustrated) may also be included to determine the relative tilt of the elevator mechanism 18 or fork carriage 17. FIGS. 9-11 illustrate the elevator mechanism 18 being tilted, however, as one skilled in the art would recognize, the elevator mechanism 18 may remain stationary while the fork carriage 17 is tilted. By tilting the elevator mechanism 18 or fork carriage 17, the AGV 10 may compensate for the differences between the relative angles of the supporting surface of the AGV 10 and the supporting surface of the pallet 60. This compensation allows the AGV to place the load securely on the transport floor 57 and then remove the forks 16 with minimal interference such that the removal of the forks 16 from the pallet pockets 74 is substantially free of interference such that the load 60 is not substantially shifted out of position.

In placing a load 60 in the transport 50, for severe relative angles between the supporting surface of the AGV 10 outside of or partially in the transport 50, to the relative position of the transport floor 57, multiple adjustments may be required in tilting the elevator mechanism 18 or fork carriage 17 by the tilt mechanism 40. More specifically, such as for high loads that have minimal clearance to the transport roof 58, multiple angular adjustments of the mechanism 40 may be required in coordination with the movement of the AGV along the longitudinal axis of the transport. For example, as the AGV 10 enters the transport 50, the tilt mechanism 40 may be required to have a coordinated tilting motion specifically coordinated with the forward motion of the AGV 10. Therefore, for loads of minimal clearance, the pallet 72 makes an approximately arcuate motion such that the load does not become engaged against either the transport roof 58 or transport floor 57. Therefore, as the AGV 10 extends forward into the transport, the tilt mechanism 40 incrementally angles the load 60 so that the front edge of the pallet 72 does not contact the transport floor 57. The pallet 72 is then placed in the desired position on the transport floor 57. The forks 16 are then lowered during placement of the load 60 and the AGV reverses its course of direction out of the transport 50. Due to the minimal clearance within the pallet pockets 74, the forks 16 generally are also incrementally tilted as the AGV exits the transport to ensure that the forks 16 do not become engaged against the pallet pockets 74. Once the forks 16 are substantially free of the pallet pockets 74, the AGV may continue back to position A, and at the same time return the tilt mechanism 40, and specifically one of the elevator mechanism 18 and fork carriage 17 back to its substantially vertical position.

As discussed above, the controller on the AGV or system controller may measure the relative angles of the AGV supporting surface and transport floor 57 to determine the required tilting of the load 60 or forks 16 as the AGV moves in and out of the transport 50 and, if necessary, the coordinated motion of the forks 16 with the movement of the AGV. This ensures that the end of transport 50 loading or loads nearest to the threshold occurs smoothly and efficiently and prevents displacement or misalignment of the placement of the loads as the AGV 10 loads the threshold 52 of the transport 50. The above described system may also be reversed as illustrated in the figures to improve unloading of transports 50. More specifically, as the AGV extends its forks 16 to the pallet pockets 74 on at least the first load 60 at the threshold 52 or end of the transport 50, the AGV may use the determined relative positioning of the transport 50 to align the forks 16 using the tilt mechanism 40 to prevent interference of the forks 16 within the pallet pockets 74. The AGV may also coordinate the motion of the forks 16 as they enter the pallet pockets 74, to ensure as the AGV moves forward that the forks 16 do not contact the pallet 72. It is expected that when the sensor 100 measures the transport 50 that is loaded with loads at the position A, the sensor will need to measure the transport roof 58 as the loads 60 may interfere with measuring the transport floor 57. Of course, in some embodiments, sensors may be placed outside of the loading bay doors or outside the loading facility extending over the transport loading area 87 and determine the relative positioning of the transports 50, thereby eliminating the need of individual AGVs 10 to scan the transport. A sensor 100 within the facility and not on the AGV 10 may also measure one of the transport 50 floor or roof and communicate that to the AGV or system controller. The use of these outside scanners may communicate with a central controller, which determines the position of the transport relative to the loading bay facility and updates the AGV with the necessary information to both properly place the loads as well as load and unload the loads closest to the threshold 52.

In some embodiments, the transport will have no sidewalls, but be a flat bed while the AGV is loading loads onto the transport. In these circumstances, the AGV may sense the defining edge between the bed or floor of the transport and the sharp drop off to the ground. Therefore, the AGV may be configured to scan the absence of trailer side walls.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method for loading a transport having sidewalls and a threshold with an automatic guided vehicle (AGV) comprising:
    engaging a load with the AGV;
    guiding the AGV with a primary guidance system to a position outside of the threshold of the transport;
    profiling the threshold of the transport and the interior of the transport before the AGV passes the threshold of the transport to determine a travel path for the AGV to pass through the threshold of the transport from said position outside the transport and to a load position;
    guiding the AGV along the determined travel path across the threshold and further within the transport to the load position on the transport and profiling the interior of the transport at least once as the AGV is guided to the load position within the transport; and
    guiding the AGV within the transport from the load position to a position outside the threshold of the transport.

2. The method of claim 1 wherein said step of guiding the AGV within the transport is performed by a second guidance system.

3. The method of claim 1 wherein said step of guiding the AGV within the transport is performed by the primary guidance system.

4. The method of claim 1 wherein said step of guiding the AGV within the transport further includes the step of using a sensor to obtain the distance from at least one sidewall and at the same time determine any obstructions within the travel path of the AGV.

5. The method of claim 1 wherein said step of guiding the AGV within the transport to the intended load position includes the step correcting for any deviation from the intended transport path that is determined from the profile of the transport.

6. The method of claim 5 wherein said step of guiding the AGV within the transport further includes the step of updating the profile within the transport when the primary guidance system expects the AGV to be substantially aligned with the determined transport path.

7. The method of claim 1 wherein said step of profiling the transport occurs at least once in the transport but less than approximately 35 times every second.

8. The method of claim 1 further including the step of sensing the edge of the transport floor as the AGV is guided along the determined transport path.

* * * * *